US012664167B1

(12) United States Patent
Bracco et al.

(10) Patent No.: US 12,664,167 B1
(45) Date of Patent: Jun. 23, 2026

(54) DISTRIBUTED SEARCH AND RETRIEVAL USING UNIFORM IDENTIFIERS OF LOAN POOLS AND RULE-BASED TOOLS FOR RESTRUCTURING OF THE LOAN POOLS

(71) Applicant: Federal Home Loan Mortgage Corporation (Freddie Mac), McLean, VA (US)

(72) Inventors: Bruce Bracco, Chantilly, VA (US); Matthew J Seu, Ashburn, VA (US); Robert A Cimperman, Fairfax, VA (US)

(73) Assignee: Federal Home Loan Mortgage Corporation (Freddie Mac), McClean, VA (US)

( * ) Notice: Subject to any disclaimer, the term of this patent is extended or adjusted under 35 U.S.C. 154(b) by 0 days.

(21) Appl. No.: 16/120,110

(22) Filed: Aug. 31, 2018

Related U.S. Application Data

(60) Provisional application No. 62/553,724, filed on Sep. 1, 2017.

(51) Int. Cl.

| | |
|---|---|
| *G06F 16/2455* | (2019.01) |
| *G06F 16/2458* | (2019.01) |
| *G06Q 10/04* | (2023.01) |
| *G06Q 40/03* | (2023.01) |

(52) U.S. Cl.
CPC .... *G06F 16/24564* (2019.01); *G06F 16/2471* (2019.01); *G06Q 10/04* (2013.01); *G06Q 40/03* (2023.01)

(58) Field of Classification Search
USPC .......................................................... 705/38
See application file for complete search history.

(56) References Cited

U.S. PATENT DOCUMENTS

| | | | | |
|---|---|---|---|---|
| 7,885,891 B1 * | 2/2011 | Washington | ......... | G06Q 40/025 |
| | | | | 705/38 |
| 8,521,644 B1 * | 8/2013 | Hanson | .................. | G06Q 40/06 |
| | | | | 705/37 |

(Continued)

OTHER PUBLICATIONS https://web.archive.org/web/20161221105001/https://www.ginniemae.gov/investors/multiclass_resources/Documents/platinum_import_layout.pdf (2016).*

*Primary Examiner* — Gregory A Pollock
(74) *Attorney, Agent, or Firm* — Finnegan, Henderson, Farabow, Garrett & Dunner LLP

(57) ABSTRACT

A system for distributed search and retrieval of loan pools and rule-based reorganization thereof may include a processor configured for receiving a first unique identifier and ownership indicator of a first loan pool and a second unique identifier and ownership indicator of a second loan pool; generating a first request and a second request for at least an interest rate, loan term, and balance for each loan in the first pool and the second pool, respectively; transmitting the first request and the second request to a first remote server and a second remote server, respectively; obtaining rules relating loan characteristics to pseudo pool validity; receiving a proposed pseudo pool; applying the rules to the proposed pseudo pool to generate a validity indicator; when the indicator is false: generating an error message; and when the indicator is true: generating a proposed disclosure document including the proposed pseudo pool.

21 Claims, 16 Drawing Sheets

(56) References Cited

U.S. PATENT DOCUMENTS

| | | | | |
|---|---|---|---|---|
| 2004/0128228 A1* | 7/2004 | Whipple | ................ | G06Q 20/10 |
| | | | | 705/38 |
| 2004/0128229 A1* | 7/2004 | Raines | ................... | G06Q 40/00 |
| | | | | 705/38 |
| 2004/0215553 A1* | 10/2004 | Gang | ..................... | G06Q 40/00 |
| | | | | 705/38 |
| 2004/0215555 A1* | 10/2004 | Kemper | ............. | G06Q 30/0283 |
| | | | | 705/38 |
| 2004/0220873 A1* | 11/2004 | Nolan, III | .............. | G06Q 30/06 |
| | | | | 705/38 |
| 2004/0225597 A1* | 11/2004 | Oppenheimer | ...... | G06Q 20/382 |
| | | | | 705/38 |

* cited by examiner

FIG. 8

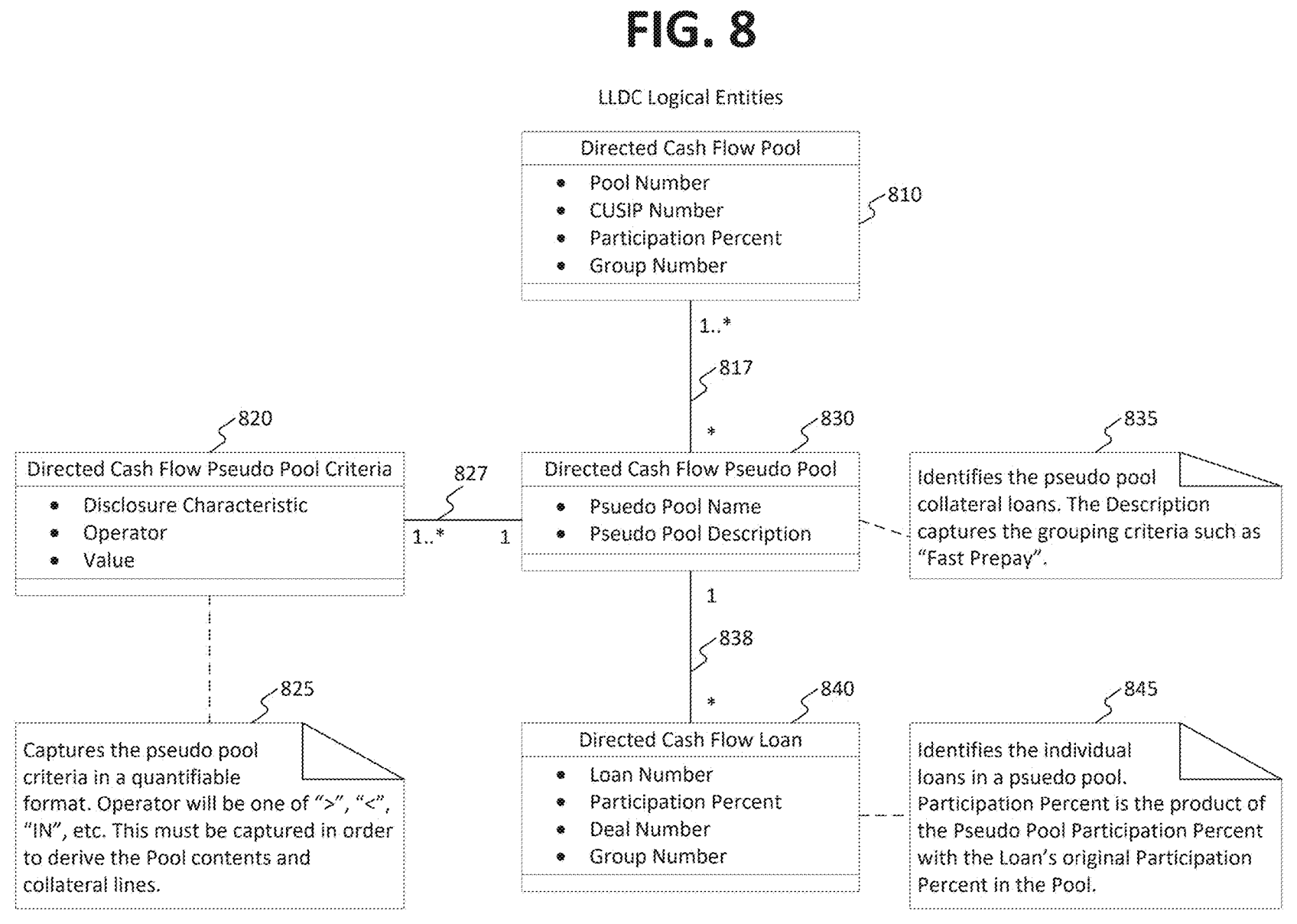

LLDC Logical Entities

Directed Cash Flow Pool — 810
- Pool Number
- CUSIP Number
- Participation Percent
- Group Number

1..* — 817

Directed Cash Flow Pseudo Pool — 830
- Psuedo Pool Name
- Pseudo Pool Description

*

Identifies the pseudo pool collateral loans. The Description captures the grouping criteria such as "Fast Prepay". — 835

1 — 838

Directed Cash Flow Loan — 840
- Loan Number
- Participation Percent
- Deal Number
- Group Number

*

Identifies the individual loans in a psuedo pool. Participation Percent is the product of the Pseudo Pool Participation Percent with the Loan's original Participation Percent in the Pool. — 845

1..* — 827

1

Directed Cash Flow Pseudo Pool Criteria — 820
- Disclosure Characteristic
- Operator
- Value Captures the pseudo pool criteria in a quantifiable format. Operator will be one of ">", "<", "IN", etc. This must be captured in order to derive the Pool contents and collateral lines. — 825

DISTRIBUTED SEARCH AND RETRIEVAL USING UNIFORM IDENTIFIERS OF LOAN POOLS AND RULE-BASED TOOLS FOR RESTRUCTURING OF THE LOAN POOLS

CROSS-REFERENCE TO RELATED APPLICATIONS

The present application claims the benefit of priority of U.S. Provisional Patent Application No. 62/553,724, filed on Sep. 1, 2017. The foregoing application is incorporated herein by reference in its entirety.

TECHNICAL FIELD

The present disclosure relates generally to the field of distributed search and retrieval. More specifically, and without limitation, this disclosure relates to systems and methods for providing rule-based reorganization of loans obtained via distributed search and retrieval.

BACKGROUND

Many consumers/borrowers that purchase property borrow funds from a lender and grant the lender a security interest in the home, land, and/or other property, which serves as collateral. The legal document whereby the consumer uses the property as collateral for repayment of the loan is commonly known as a mortgage or mortgage loan. Lenders sell many of the mortgage loans that they originate into the secondary mortgage market. Mortgage-backed securities (MBS) Issuers including (hereafter, collectively referred to as Issuers) the Federal Home Loan Mortgage Corporation (Freddie Mac), the Federal National Mortgage Association (Fannie Mae), both of which are Government-Sponsored Enterprises (GSE), the Government National Mortgage Association (Ginnie Mae), and other entities typically referred to as Private-Label Issuers are all participants in the secondary mortgage market. By buying mortgage loans in the secondary mortgage market, participants like Freddie Mac provide lenders with capital that allows them to meet consumer demand for additional home mortgages. The secondary market for mortgage loans renders available a supply of money for housing, thus lowering the cost of money and ultimately lowering the cost of home ownership for consumers.

Secondary mortgage market buyers typically either purchase home mortgages for cash or issue securities in exchange for the mortgages. A security that is exchanged for a mortgage loan(s) is known as a mortgage-backed security (MBS). An MBS is typically a pass-through security representing an undivided beneficial interest in one or more pools of mortgage loans. An MBS is called a pass-through security because the borrowers' payments of principal and the majority of interest payments are passed through to holders of interests in the MBS. In general, a mortgage pool is a positively identified group of mortgage loans combined for resale to individuals or entities. An MBS may be backed by mortgage loans originated by one or more lenders.

The process of forming the mortgage pools and issuing an MBS is called securitization. MBSes, like most securities trading in the United States, are generally assigned a CUSIP (Committee on Uniform Securities and Identification Procedures) identifier, which is a unique nine-character identifier that uniquely identifies the security. A CUSIP number is similar a serial number; each individual security traded in the US market, such as an MBS, usually has a different CUSIP number that uniquely identifies the security.

MBSes have distinguishing features that set them apart in the secondary market. MBSes are usually priced based on the perceived value of the underlying mortgage collateral, as well as on the program and payment characteristics and guarantees of the Issuer of the MBS. Although this description refers to MBSes throughout, one of ordinary skill will understand that any security backed by one or more pool of loans (such as auto loans, student loans, or the like) may be used with the embodiments described herein. Accordingly, the present disclosure extends to any MBS-like securities.

Conventional MBSes have been available for some time. The Tax Reform Act of 1986 (TRA 1986) eliminated many of the tax advantages of traditional real estate ownership and syndication, but offset this in part by creating an innovative tax structure that changed the way real estate mortgages could be held. The TRA 1986 authorized the creation of real estate mortgage investment conduits (REMICs) as a vehicle for creating multi-class, pass-through MBSes that resolved certain tax and balance sheet problems associated with a mortgage security called a "collateralized mortgage obligation" or CMO. A REMIC is a mortgage security that separates mortgage pools into different maturity and risk classes and serves as a conduit for holding the mortgage pools that back it. Cash flows derived from payments of principal and interest on the underlying mortgages are passed through the REMIC structure to holders of bonds representing each REMIC class, with no income tax consequences to the REMIC structure itself. A REMIC structure file instructs a computer system of a given vendor/dealer how to direct the cash flows from these payments to particular securities or accounts.

As explained above, MBSes may be formed by pooling individual loans into one or more pools. REMIC securities are formed by directing the cash flows of these pools according to the REMIC structure associated with the security. However, additional hierarchies of MBS pooling may be used. For example, a Giant MBS is a single-class pass-through security formed by combining individual MBSes (or portions of MBSes) with other MBSes (or portions of MBSes). Giant MBSes may be known by other names throughout the industry. For example, Fannie Mae refers to a similar MBS as a "Mega."

Giant MBSes allow investors to manage their portfolios efficiently by consolidating smaller MBSes into one security. For example, an investor holding a portfolio of 100 smaller MBSes, each a separate security, has to track and account for 100 different CUSIP numbers. If the investor combines the 100 MBSes into a single Giant MBS, however, the investor has to track and account for only the single CUSIP number assigned to the Giant MBS. Forming a Giant MBS may thus reduce the internal processing burden associated with tracking the balance and monitoring the monthly payments associated with each underlying mortgage investments, as compared to the costs associated with several smaller MBSes that each pay on different schedules and may amortize at different rates. It is more economical and technologically efficient to receive periodic payments by wire from a single Giant MBS than to receive multiple wire payments from multiple MBSes. Large Giant MBSes may be backed by a more diverse pool of mortgages, making them more attractive to some investors than smaller and less diverse MBSes. However, Giant MBSes are also difficult to assess on a loan level because at least two layers of information deconstruction are required. In particular, all of the identifiers of MBSes within the Giant must be obtained and partitioned in accordance with an investor's ownership share of the Giant and the portion of each MBS contributed to the Giant. Thereafter, all of the identifiers of loans within each MBS must be obtained and partitioned in accordance with the investor's ownership share of the Giant and the portion of each MBS contributed to the Giant. This is difficult to perform manually, particularly if MBS-level and/or loan-level data is scattered across numerous entities.

A conventional REMIC does not separate cash flows from specific loans backing an MBS or Giant MBS from the overall cash flow of the security, and a prospective REMIC holder cannot specify the characteristics of the individual mortgage loans backing a REMIC. Instead, REMIC payments are determined by the monthly principal and interest collectively received on all MBS pools and Giants backing the REMIC, and is allocated based on Payment Rules establish at the time of REMIC issuance. Calculations are determined using internal, rules-based language that is implemented through the Modeling and Payment systems. REMIC structures are typically created by Issuers' internal modeling teams based on input from the requesting underwriter.

As a result, the value of mortgages with more favorable or more desirable characteristics in an MBS may be adversely affected by mortgages with less favorable or less desirable characteristics, and the total value of the MBS is often reduced because the market tends to value the MBS as a whole based upon the predominate characteristics of the underlying loans. Accordingly, if smaller partitions of loans within an MBS-like security are more favorable than the predominate loans, this is not typically reflected in the pricing of the security.

In addition, characteristics of loan pools backing an MBS (or a Giant MBS) may change over time. For example, some loans may be repaid faster than others, some loans may have changing loan-to-value (LTV) ratios based on shifts in the real estate market of the area in which the loans originated, and so on. These changing characteristics may render particular loans within the pools more valuable over time while rendering others less valuable over time. Reorganization of the loans within REMICs may therefore present a possibility for capturing the changing value of the loans over time.

One possible solution is to collapse an MBS or a Giant MBS to the backing loans and repooling the loans into a new MBS. For example, in order to form an MBS that contains specific mortgages, an MBS or a Giant MBS and its constituent parts (whether loan pools or MBSes) could be disaggregated and the mortgages reformed into at least two new pools, at least one of which could be resecuritized into an MBS backed by desired mortgages. REMIC classes based on the new MBS could then be issued for the desired cash flows, for example, cash flows from mortgage loans that were originated in Florida, or the like.

Collapsing an MBSes or a Giant MBS and issuing new MBSes or Giant MBSes and REMIC classes, however, has several drawbacks. For example, a Giant MBS typically may not be disaggregated into its constituent pools without the consent of all holders. In most cases, gaining the consent of all holders may be impossible because a holder of a pro rata portion of an MBS does not know, and may not be able to know, the holders of the remaining pro rata portion(s) of the same MBA. Effectively the holder of an MBS must own 100% of the pool in order for a pool collapse to be operationally feasible. Another drawback is that disaggregation and repooling fragments the market by producing specialized MBSes, some of which may be undesirable to investors. This potential for fragmentation is a particular concern for the Agency issuers of the MBS, who typically grant a request to collapse and repool only in extreme circumstances. Another problem is that most of the benefits associated with an MBS or a Giant MBS, such as size, liquidity, and transparency, are lost by disaggregation. Moreover, the process is rather economically inefficient due to costs associated with collapsing the MBS or Giant MBS and higher servicing costs associated with forming and maintaining the new MBSes.

In view of the foregoing, improved systems and methods for automatically and efficiently creating and validating MBSes and Giant MBSes using distributed database technology, as well as new systems and methods for automatically using rules to assist with loan pool reorganization, are desirable.

SUMMARY

In view of the foregoing, embodiments of the present disclosure describe systems using rules for creating non-tradable "pseudo pools" backed by loan level directed mortgage cash flows. In particular, the rule-based systems of the present disclosure may allow for the automated direction of loan level mortgage cash flows to pseudo pools and the validation of the same pseudo pools against established pooling rules. By using rules to automate creation and validation of the pseudo pools and providing an automatically generated disclosure document using, for example, a web portal, systems of the present disclosure may improve the efficiency of MBS creation as well as providing greater flexibility in structuring MBSes and in generating numerous potential disclosure documents without expending the significant manual efforts usually required.

In addition, embodiments of the present disclosure may use a plurality of distributed databases to conduct searches for and pulls of information relating to loan-level disclosures of loan pools. This distributed information, which used to be difficult to access without manual intervention, may be pulled automatically due to the Internet and other networking technologies.

In one embodiment, the present disclosure describes a system for conducting distributed search and retrieval of loan pools and applying rules for reorganization of the loans within the pools. The system may comprise at least one memory storing instructions and at least one processor configured to execute the instructions to perform operations. The operations may comprise receiving a first unique identifier of a first loan pool; receiving a first ownership indicator associated with the first loan pool; and generating a first request for at least an interest rate, a loan term, and a balance for each loan in the first loan pool. The first request may include the first unique identifier. The operations may further comprise transmitting the first request to a first remote server identified as storing information regarding the first loan pool; receiving a second unique identifier of a second loan pool; receiving a second ownership indicator associated with the second loan pool; and generating a second request for at least an interest rate, a loan term, and a balance for each loan in the second loan pool. The second request may include the second unique identifier. The operations may further comprise transmitting the second request to a second remote server identified as storing information regarding the second loan pool; obtaining one or more rules relating characteristics of loans in a pseudo pool to a validity of the pseudo pool; and receiving a proposed pseudo pool comprising a portion of the loans in the first loan pool and a portion of the loans in the second loan pool; applying the one or more rules to the proposed pseudo pool to generate a validity indicator. When the validity indicator is false, the at least one processor may generate an error message. When the validity indicator is true, the at least one processor may generate a proposed disclosure document including the proposed pseudo pool.

In one embodiment, the present disclosure describes a system for conducting distributed search and retrieval of loan pools and applying rules for reorganization of the loans within the pools. The system may comprise at least one memory storing instructions and at least one processor configured to execute the instructions to perform operations. The operations may comprise receiving a first unique identifier of a first loan pool; receiving a first ownership indicator associated with the first loan pool; and generating a first request for at least an interest rate, a loan term, and a balance for each loan in the first loan pool. The first request may include the first unique identifier. The operations may further comprise transmitting the first request to a first remote server identified as storing information regarding the first loan pool; applying one or more rules relating ownership indicators to loans in a loan pool to the first ownership indicator and the loans of the first loan pool to select a relevant first subset of loans; receiving a second unique identifier of a second loan pool; receiving a second ownership indicator associated with the second loan pool; and generating a second request for at least an interest rate, a loan term, and a balance for each loan in the second loan pool. The second request may include the second unique identifier. The operations may further comprise transmitting the second request to a second remote server identified as storing information regarding the second loan pool; applying the one or more rules relating ownership indicators to loans in a loan pool to the second ownership indicator and the loans of the second loan pool to select a relevant second subset of loans; obtaining one or more rules relating characteristics of loans in a pseudo pool to a validity of the pseudo pool; determining a proposed pseudo pool comprising a portion of the relevant first subset of loans and a portion of the relevant second subset of loans using the one or more rules; and generating a proposed disclosure document including the proposed pseudo pool.

In one embodiment, the present disclosure describes a system for conducting distributed search and retrieval of loan pools and applying rules for reorganization of the pools. The system may comprise at least one memory storing instructions and at least one processor configured to execute the instructions to perform operations. The operations may comprise receiving, from a user of the system, a first unique identifier of a first loan pool and a first ownership indicator associated with the first loan pool; based on the first unique identifier, determining at least one first remote server storing information regarding the first loan pool; generating, using the first unique identifier, a first request for at least an interest rate, a loan term, and a balance for each loan in the first loan pool; transmitting the first request to the at least one first remote server; receiving, from the user of the system, a second unique identifier of a second loan pool and a second ownership indicator associated with the second loan pool; based on the second unique identifier, determining at least one second remote server storing information regarding the second loan pool; generating, using the second unique identifier, a second request for at least an interest rate, a loan term, and a balance for each loan in the second loan pool; transmitting the second request to the at least one second remote server; obtaining one or more rules relating characteristics of loans in a pseudo pool to a validity of the pseudo pool; receiving a proposed pseudo pool comprising a portion of the loans in the first loan pool and a portion of the loans in the second loan pool; and applying the one or more rules to the proposed pseudo pool to generate a validity indicator. When the validity indicator is false, the at least one processor may generate an error message. When the validity indicator is true, the at least one processor may generate a proposed disclosure document including the proposed pseudo pool, receive approval of the proposed pseudo pool, and form a pseudo pool comprising the proposed pseudo pool.

In additional embodiments, the present disclose describes non-transitory, computer-readable media for causing one or more processors to execute methods consistent with the present disclosure.

It is to be understood that the foregoing general description and the following detailed description are example and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the principles disclosed herein. In the drawings:

FIG. 8 is a block diagram illustrating exemplary logical entities underlying a software application used in an embodiment consistent with the disclosed embodiments.

DETAILED DESCRIPTION

Reference will now be made in detail to exemplary embodiments of the invention, examples of which are illustrated in the accompanying drawings. Wherever convenient, similar reference numbers will be used throughout the drawings to refer to the same or like parts. The implementations set forth in the following description do not represent all implementations consistent with the claimed invention. Instead, they are merely some examples of systems and methods consistent with the invention.

The disclosed embodiments relate to systems and methods for conducting distributed search and retrieval of loan pools and applying rules for reorganization of the pools. Embodiments of the present disclosure may be implemented using a general-purpose computer. Alternatively, a special-purpose computer may be built according to embodiments of the present disclosure using suitable logic elements.

Advantageously, disclosed embodiments may use distributed database technology to provide an automated and rule-based mechanism for creation of pseudo pools rather than using subjective, manual techniques for creation and processing. Accordingly, automated rules to extract loan-level data from loan pools, Giant MBSs, or other MBS-like securities coupled with automated rules to ensure the validity of any proposed pseudo pools may provide a faster and more flexible technique for restructuring loan pools into securities such as REMICs.

Figure 1:
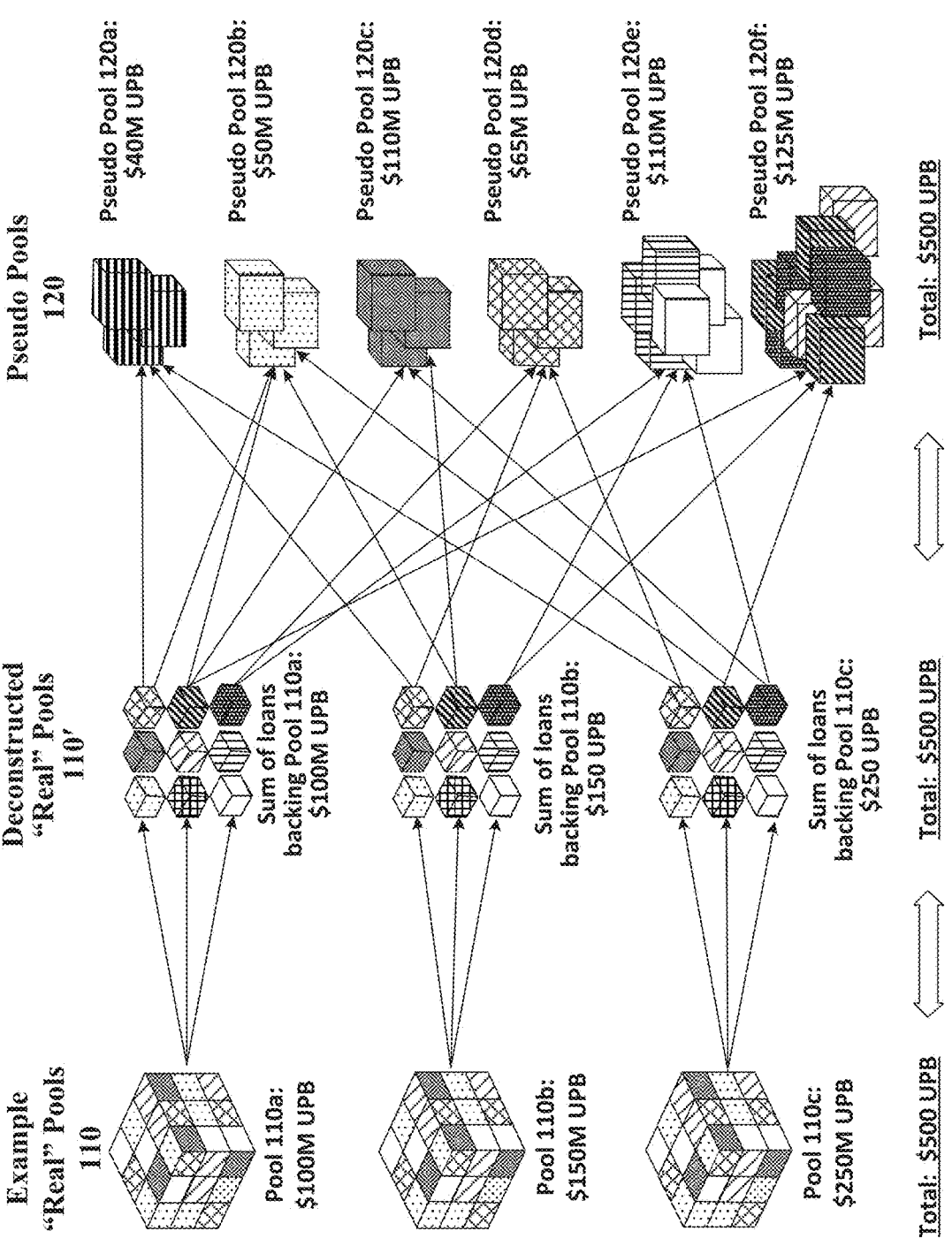
FIG. 1 is an illustration of real pool deconstruction and pseudo pool creation, consistent with disclosed embodiments.

FIG. 1 is an illustration of real pool deconstruction and pseudo pool creation, consistent with disclosed embodiments. As shown, three "real" pools 110, that is, established loan pools underlying an electronic MBS/Giant MBS certificate, are "deconstructed" into the individual loans 110' identified in the electronic certificate. Individual loan information including origination data and real time characteristic data is retrieved for each of the loans of the real pools, while preserving the original electronic certificate for the MBS/Giant MBS.

As shown in FIG. 1, the total value of loans in the MBS/Giant MBS ("Pool") 110 is equal to the sum of individual pools underlying the MBS/Giant MBS. The sum of all individual loans in the created pseudo pools 120 remains the same as the total sum of the three original pools 110. Furthermore, the electronic certificates for the original MBSes/Giant MBSes continue to exist even after the creation of the pseudo pools 120. As shown on the right side of FIG. 1, pseudo pools 120 are created with individual loans having common characteristics across the individual loans, at the time the pseudo pools 120 are created. Thus, new REMIC structure files can be created to direct cash flow for regrouped pseudo pools of similar-characteristic loans, without affecting the original MBS/Giant MBS.

Figure 2:
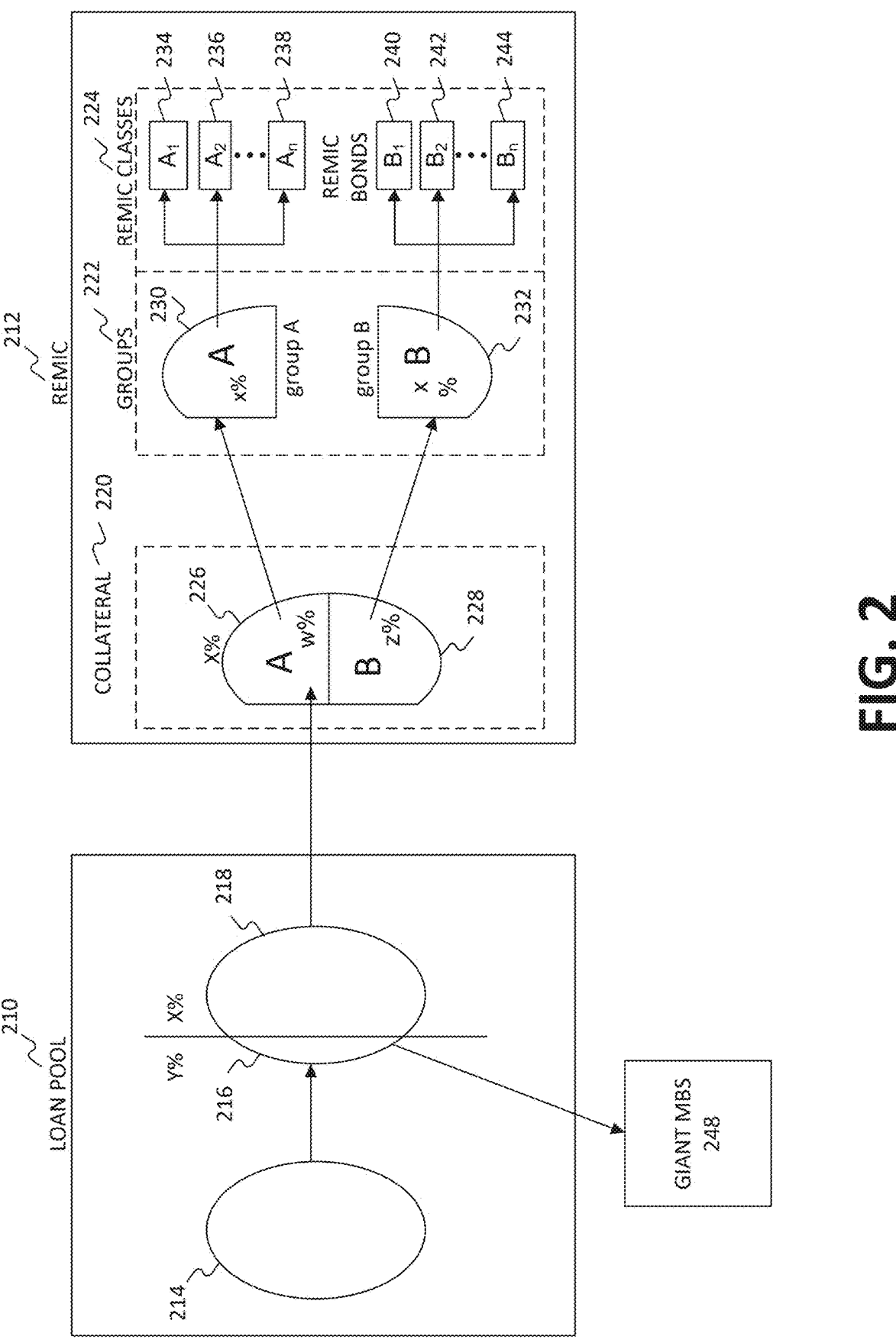
FIG. 2 is a block diagram illustrating an exemplary redirection of the loan level cash flows associated with a loan pool, in accordance with the principles of the disclosed embodiments.

FIG. 2 is a block diagram illustrating an exemplary redirection of cash flows associated with a loan pool for a group containing one loan pool in accordance with the principles of the disclosed embodiments. Although depicted and described using loan pools, the redirection depicted in FIG. 2 may be similarly performed for any MBS-like security.

The block diagram of FIG. 2 shows a loan pool 210 and a REMIC 212. The loan pool 210 contains a loan pool 214. As noted above, a REMIC may be backed by a pro rata portion of the loan pool 214. In FIG. 2, this is represented by showing loan pool 214 divided into two portions, with one portion 216 representing the REMIC holder's pro rata Y % share of the loan pool, and the other portion 218 representing the remainder X % of the loan pool. In this example, the Y % portion 216 provides the collateral cash flow for other uses, and the remainder 218 of the loan pool provides the collateral cash flow for REMIC 212.

One of ordinary skill will recognize that an entire loan pool 214, or a different sized portion 218 than that shown, could be assigned to REMIC 212, consistent with the present disclosure. The REMIC 212 contains representations of three things: collateral 220; groups 222; and REMIC classes 224. In collateral 220, portion 218 of loan pool 214 is analyzed to identify specific cash flows and their corresponding mortgage pools within the loan pool 214.

In one embodiment consistent with the present disclosure, a software application performs the collateral function by searching a database containing the mortgage loans or pools that make up loan pool 214 to identify mortgage loans or portions of pools having specified characteristics, attributes, or factors. Mortgages may be identified and pooled or grouped with other like mortgages based on many factors and characteristics, including, but not limited to, the term of the mortgage loan, the interest rate, whether the mortgage loan has a fixed interest rate, adjustable interest rate, or balloon payment feature, whether the mortgage loan was purchased for cash or purchased in exchange for a guaranteed MBS, the identity of the mortgage loan originator, the amount of the original loan balance, the mortgage loan purpose (e.g., purchase or refinance), the mortgaged property's characteristics (e.g., main residence, vacation home, investment property, owner occupied), whether the mortgage loan is seasoned or unseasoned, the geographic location of the mortgaged property (GEO), the weighted average coupon (WAC), the weighted average maturity (WAM) (e.g., the number of months left to maturity), the loan to value ratio (LTV), whether the mortgage loan has a low loan balance (LLB), and the borrower's credit score. In one embodiment, the same software application may also group the identified mortgage loans into a pool by setting a pool identifier in each mortgage's database entry. In another embodiment, grouping may be performed using pooling optimization techniques to maximize or minimize specific characteristics or attributes of a mortgage pool(s) or sub-group and thus the corresponding security(s) backed by cash flows from the pool(s).

For clarity of explanation, FIG. 2 illustrates the identification of only two different collateral groups, group A 226 and group B 228, which could be formed from underlying securities or loans that support loan pool 214, (e.g., the X % portion 218). Group A 226 accounts for w % of the portion 218 of loan pool 214, and group B 228 accounts for z % of the portion 218 of loan pool 214. The disclosed embodiments, however, allows for the identification of any number of mortgage pools and associated cash flows. As noted, there are numerous characteristics that can be used to pool or select certain mortgage loans, and the reasons for choosing various characteristics differ depending, for example, on what types of mortgages are included in the loan pool, the characteristics of the current market, investor preferences, market demand for certain cash flows, and various other factors. Pools with different characteristics are likely to have eligible candidate mortgage overlap, as a single mortgage may have characteristics that qualify it for two or more pools. In one embodiment consistent with the present disclosure, each mortgage is placed in only one pool.

The loans that comprise the loan pool 214 have available a portion of their cash flows for redirection into new securities. In FIG. 2, the available portion is X % 216 of the total cash flow from loan pool 214. A processor may separate available cash flows of loan pool 214, and direct into groups 222 that are used to back different classes of a REMIC or multiple single-class securities. A group, such as group 230 or group 232, represents the source from which the loan pool collateral cash flows are directed to back specific REMICs or securities. There are numerous variations of groups that are consistent with the disclosed embodiments. For example, as illustrated in FIG. 2, each group 222 can be created from a single identified cash flow. FIG. 2 shows two groups: group A 230 represents the cash flow from the mortgages in group A 226 of the loan pool 214, and group B 232 represents the cash flow from the mortgages in group B 228 of the loan pool 214. In other embodiments, multiple cash flows from multiple pools from one or more loan pools back one or more groups.

As shown, less than 100% of the total cash flow from loan pool 214 may be available to support groups 222 and REMIC 224. The participation percentage of a particular mortgage group within a REMIC group is determined by multiplying the percentage of the loan pool included in the group by the percentage of the loan pool assigned to the REMIC 212. For example, the participation percentage of mortgage group A 226 within group A 230 is calculated as follows:

$$\text{Participation Percent (Pool } A)=w\ \%*X\ \%.$$

Likewise, the participation percent of mortgage B 228 within group B 232 is calculated as follows:

$$\text{Participation Percent (Group } B)=z\ \%*X\ \%.$$

Participation percent denotes the amount of underlying securities available for the REMIC tranches or classes. Participation percent may help identify the relative size of the contribution of certain types of collateral, e.g. whether the collaterals backing the REMIC tranches come mainly from loan pools with certain identified characteristics or not.

As noted above, a group may be used to back a REMIC. In the embodiment illustrated in FIG. 2, group A is used to back a REMIC with classes $A_1$ 234, $A_2$ 236, through $A_n$ 238; and group B is used to back a REMIC with classes $B_1$ 240, $B_2$ 242, through $B_n$ 244. Each group can back any number of REMIC classes, 1 through n, as illustrated in FIG. 2. Moreover, a REMIC may be backed by more than one group. In the embodiment shown, the securities are multi-class securities. Other embodiments may create multiple single class securities or a mix of multi-class and single-class securities. For example, in FIG. 2, group 216 is used to back a Giant MBS 248.

In one embodiment consistent with the present disclosure, the process of directing cash flows from the loan pool into new securities is based upon a potential investor's preferences. In this embodiment, the cash flows in a loan pool are identified, for example, in the index phase 220, and they are disclosed to the potential REMIC investor. Alternatively, the loan pool may be provided by the potential REMIC investor, in which case the investor may be aware of what types of mortgages are underlying the loan pool and available for backing one or more REMICs. In either case, the potential REMIC investor may provide input as to what cash flows he or she wishes to break out into separate securities. Based on this input, the securities-creation process is tailored to generate groups and REMIC classes consistent with the potential REMIC investor's wishes. For example, if an investor wishes to create or purchase a REMIC class backed by only mortgage loans that were originated in Florida, embodiments consistent with the present disclosure create a pool (or pseudo pool, as discussed below) without collapsing the original pool that contains the subset of Florida-originated mortgage loans.

Other embodiments consistent with the present disclosure can accommodate more complex requests from a potential MBS or REMIC investor, MBS issuer, Giant MBS holder, or other interested party. For example, an investor may specify that he or she wishes to invest in a loan pool backed by a combination of High Loan Balance (HLB) mortgages, high weighted average coupon (WAC) mortgages, and adjustable rate (AR) mortgages. To accommodate this, the HLB, WAC and AR cash flows within a loan pool, an MBS or Giant MBS(es), and/or portions of an MBS or Giant MBS(es), may be identified and directed into a single pseudo pool that is used to back a REMIC Group, whose cash flows are structured into individual REMIC Classes which are then sold to the investor. Embodiments consistent with the present disclosure provide this ability without collapsing the loan pool, MBS, or Giant MBS.

Figure 3:
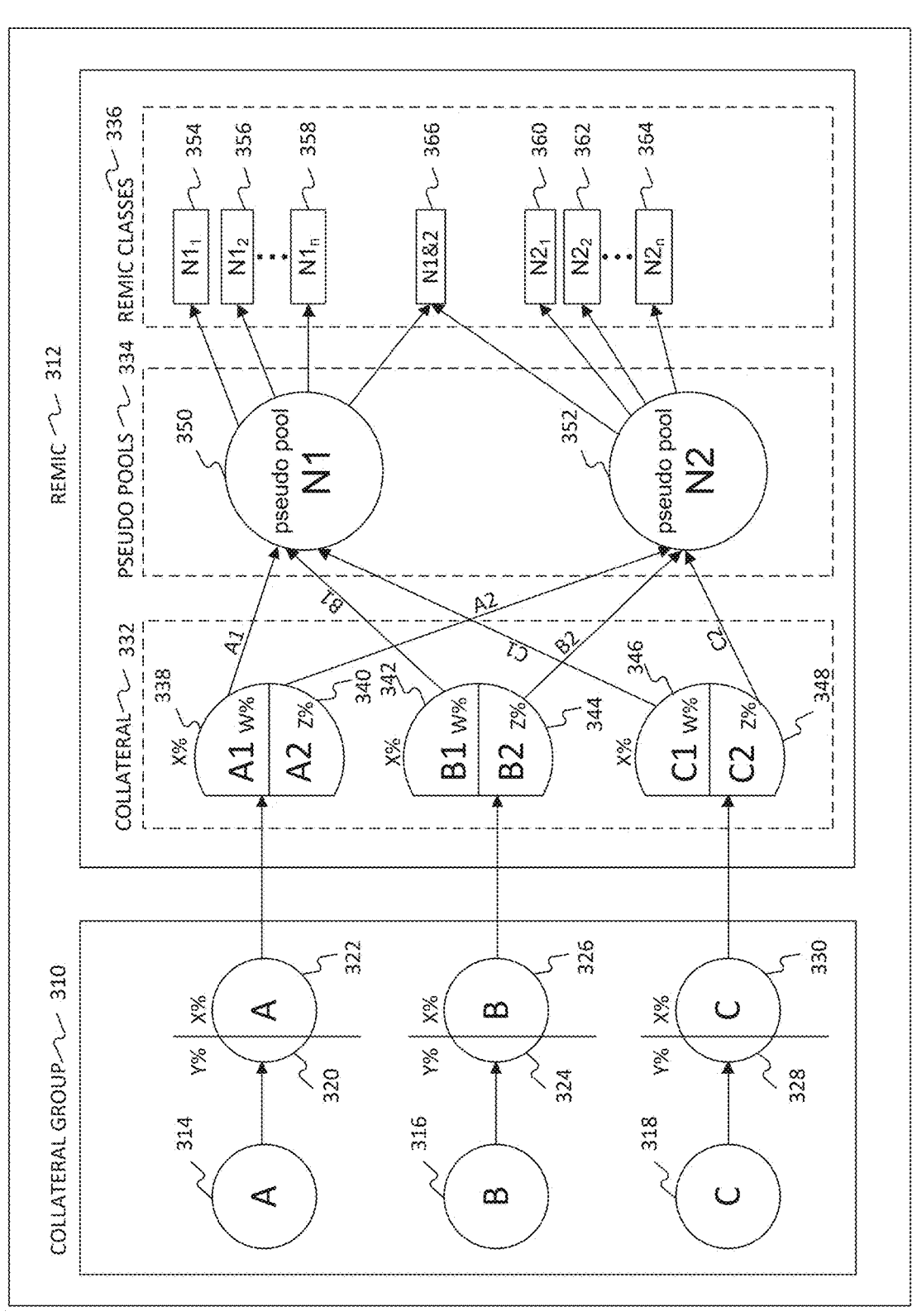
FIG. 3 is a block diagram illustrating an exemplary redirection of loan level cash flows associated with a loan pool for a group containing more than one loan pool, in accordance with the principles of the disclosed embodiments.

FIG. 3 is a block diagram illustrating an example of re-directing cash flows for a group of loan pools containing more than one loan pool in accordance with the principles of the disclosed embodiments. This embodiment directs cash flows from a group that contains several loan pools. It is to be understood that the Figures illustrate the analysis and processing of an MBS for discussion purposes only, and the embodiments disclosed herein may process smaller MBS-like securities without departing from the scope of the present disclosure.

In FIG. 3, the process of re-directing cash flows from loan pools to a new security is organized under two pseudo pools, the pseudo pool 350, and the pseudo pool 352. Collateral group 310 contains three different loan pools, loan pool A 314, loan pool B 316, and loan pool C 318. In the embodiment shown, the loan pools are partially used for other purposes, so a pro rata portion of each loan pool is unavailable for creating pseudo pools. As shown, loan pool A 314 is divided into a Y % pro rata portion 320, and X % portion 322. Loan pool B 316 and loan pool C 318 are similarly divided. The Y % portions may be used for purposes such as, for example, backing a conventional REMIC. The size of the pro rata portions is not critical to the present disclosure. For convenience, each loan pool is shown with the same size portions Y % and X %, but this need not be the case. Also, an entire undivided loan pool (not shown) may be used to provide cash flows for REMIC 312.

The remaining portions (X %) of loan pool A 322, loan pool B 326, and loan pool C 330 are used for the REMIC 312. In the collateral 332 of the REMIC group 312, each loan pool portion is analyzed to identify specific cash flows. As shown, cash flows $A_1$ 338 and $A_2$ 340 are identified within the available portion of loan pool A, where cash flow $A_1$ 338 accounts for w % of loan pool A 314 and cash flow $A_2$ 340 accounts for z % of loan pool A 314. Cash flows $B_1$ 342 and $B_2$ 344 are identified within the available portion of loan pool B, where cash flow $B_1$ 342 accounts for w % of loan pool B 316 and cash flow $B_2$ 344 accounts for z % of loan pool B 316. Cash flows $C_1$ 346 and $C_2$ 348 are identified within the available portion of loan pool C 318, where cash flow $C_1$ 346 accounts for w % of loan pool C 318 and cash flow $C_2$ 348 accounts for z % of loan pool C 318. As previously explained, the illustrated cash flows are exemplary and any number of cash flows may be identified within a specific group of loan pools. The illustrated percentages w % and z % are arbitrary and not critical to some embodiments of the present disclosure. For illustration in this example, the same percentages are used for each loan pool; they need not be the same, but will vary according to the mortgages in each loan pool and the desired loan/cash flow characteristics. Determining which loans or pools within a group of loan pools are used to produce a certain cash flow may involve an optimization algorithm or technique designed to produce the most valuable or market-desirable group of REMIC classes. As noted previously, cash flows are identified based on specified characteristics of the underlying mortgages that make up collateral group 310.

As shown in REMIC 312, two different pseudo pools 334 are created to direct the Giant MBSes' cash flows: pseudo pool N1 350 and pseudo pool N2 352. The cash flows identified in the collateral 332 of the REMIC 312 are directed to the appropriate subgroups. As shown in FIG. 3, cash flows $A_1$ 338, $B_1$ 342, and $C_1$ 346 are directed into pseudo pool N1 350; and cash flows $A_2$ 340, $B_2$ 344, and $C_2$ 348 are directed into pseudo pool N2 352. Creating pseudo pools from a plurality of cash flows from a combination of multiple loan pools, as shown in this embodiment, allows flexibility in creating pseudo pools, and consequently securities, with specific characteristics to satisfy customer demand. For example, cash flows A1, B1, and C1 may be generated by initial interest loans, providing subclasses $N1_{1 \ldots n}$ to a customer demand for securities backed by initial interest loans.

Considering the identification and division of loans in collateral 332 into pseudo pools 334, one of ordinary skill will appreciate that determining how to best allocate the available collateral loans among the pseudo pool is a difficult and complex problem. For example, how to determine the most desirable percentage A1 338 of the available portion 322 of loan pool A 314 to allocate to pseudo pool N1 350, which backs REMIC classes 354-358 and 366, is a difficult and complex problem because there may be many mortgage pools, portions of mortgage pools, individual mortgage loans, etc. having characteristics that qualify them for inclusion in more than one pseudo pool 334, especially where a pseudo pool is formed based on multiple loan characteristics. As mentioned previously, determining which pseudo pool to place collateral in may be straight forward, such as identifying the individual loans having a single characteristic, or it may require more sophistication, such as an algorithm that takes into account collateral characteristics, output security characteristics, market prices, and other factors, to identify the loans from a loan pool to assign to a particular pseudo pool.

One embodiment consistent with the present disclosure employs a pooling optimization engine to determine which pseudo pool available collateral should be placed in. In one implementation consistent with the present disclosure, a computer application allows a user to evaluate a specific pooling-related business strategy and select a specific optimization methodology to help make pooling decisions for placing loans into specific pseudo pools 334. The application may implement a pooling optimization engine (POE) that may execute various optimization algorithms for flexibly selecting pooling criteria, with the goal of creating the most desirable allocation of collateral loans to securities. The most desirable allocation may, for example, generate the highest selling price for the resulting REMIC classes 336 in the appropriate market. One of ordinary skill will recognize that criteria other than or in addition to highest selling price may be used to determine the most desirable allocation of collateral loans to securities, and that embodiments employing optimization using other, or additional, criteria are within the scope of the present disclosure.

Participation percent for the embodiment illustrated in FIG. 3 is determined using the same equation discussed in connection with FIG. 2. The participation percent of a particular pool within a pseudo pool is determined by multiplying the percentage of the loan pool included in the pseudo pool by the percentage of the loan pool assigned to the REMIC group. For example, the participation percent of pool $A_1$ 338 within pseudo pool N1 350 is calculated as follows:

$$\text{Participation Percent (Pool } A_1) = w \% \ (A_1)^* X \% \text{ (Loan Pool } A).$$

Likewise, the participation percent of pool $B_1$ 342 and pool $C_1$ 346 within pseudo pool N1 350 are calculated as follows:

$$\text{Participation Percent (Pool } B_1) = w \% \ (B_1)^* X \% \text{ (Loan Pool } B),$$

$$\text{Participation Percent (Pool } C_1) = w \% \ (C_1)^* X \% \text{ (Loan Pool } C).$$

Using the same equation, the participation percent of pools $A_2$ 340, $B_2$ 344, and $C_2$ 348 within pseudo pool N2 352 are calculated as follows:

$$\text{Participation Percent (Pool } A_2) = z \% \ (A_2)^* X \% \text{ (Loan Pool } A),$$

$$\text{Participation Percent (Pool } B_2) = z \% \ (B_2)^* X \% \text{ (Loan Pool } B),$$

$$\text{Participation Percent (Pool } C_2) = z \% \ (C_2)^* X \% \text{ (Loan Pool } C).$$

As illustrated in FIG. 3, each REMIC may have any number of REMIC classes ($N_1$, through n). Pseudo pool N1 350 is used to back REMIC classes $N1_1$ 354 and N12 356 through $N1_n$ 358, and pseudo pool N2 352 is used to back REMIC classes $N2_1$ 360 and $N2_2$362 through $N2_n$ 364. In addition, both pseudo pool N1 350 and pseudo pool N2 352 are used to back REMIC class N1 &N2 366. In general, a REMIC class may be supported by more than one pseudo pool.

Although depicted as non-tradeable in FIG. 3, pseudo pools 334 may instead be used to form a new tradeable security directly rather than serving to re-direct cash flows into various REMIC classes.

Figure 4:
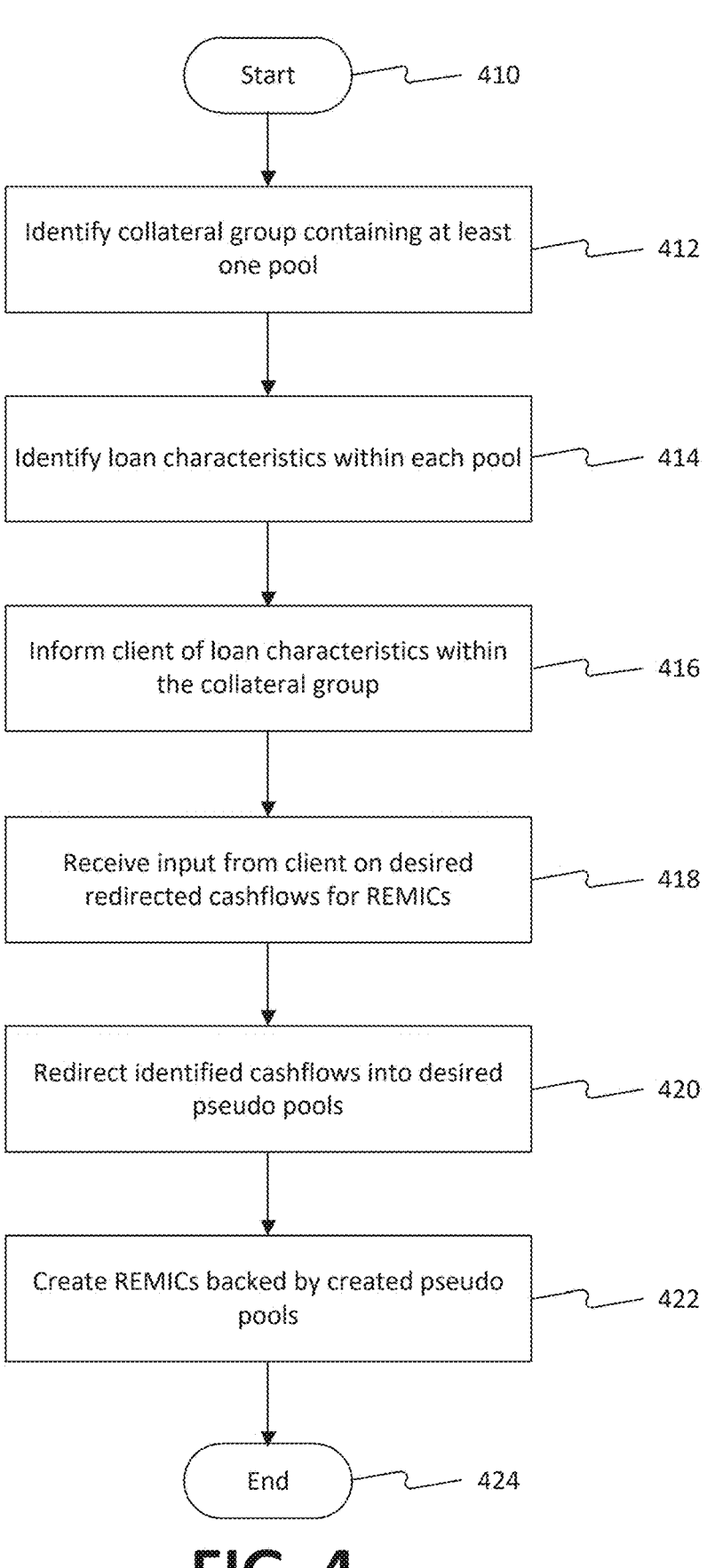
FIG. 4 is a flow chart of exemplary steps for redirecting loan level cash flows associated with a loan pool, in accordance with the principles of the disclosed embodiments.

FIG. 4 is a flow chart of exemplary steps for directing cash flows associated with a group of loan pools consistent with the present disclosure. Although described using loan pools, the cash flow direction depicted in FIG. 4 may be similarly performed for any MBS-like security.

In step 412, a group containing at least one loan pool is identified, such as collateral group 310 in FIG. 3. In one embodiment, this occurs when a loan pool holder wishes to discern other investment possibilities for his or her loans. In another embodiment, a group may be identified by analyzing a portfolio of loan pools and finding those that have at least a portion of their cash flows available for directing into new securities.

As shown in FIGS. 3 and 4, only a portion of the loan pools (e.g., x %) need be available for redirection of cash flows to back new REMIC classes or new MBS-like securities. Thus, only a subset of the current beneficial holders of the loan pools need consent to redirection of cash flows and provided their interests for inclusion in collateral 220. In contrast, collapsing the loan pools to reorganize the cash flows to back new REMIC classes or new MBS-like securities requires the consent of all beneficial holders of the loan pools, because the old loan pools will cease to exist, affecting the holders' interests.

In one embodiment consistent with the present disclosure, identification is performed by a software application that analyzes a database containing data about the loan pools and specifically about the loans that ultimately underlie the pools. In another embodiment consistent with the present disclosure, identification is performed by investors, either manually or automatically. In either case, the process may typically require some subjective decisions and market information, such as market demand, market value, etc.

In step 414, specific characteristics within each loan pool are identified. As noted above, there are many factors that can be considered singly or in combination when analyzing a loan pool to identify and re-pool the loans that generate a specified type of projected cash flow. In one embodiment consistent with the present disclosure, a software application is used to perform this identification. For example, a database management program may accept query criteria to identify loans that generate specific projected cash flows, such as loan balance <$70,000 to identify the group of loans within a loan pool that have a low loan balance.

After the loan pools have been analyzed, in step 416 a client, such as the loan pool holder, a potential investor, or any entity that can issue REMIC classes or other MBS-like securities, is informed of the cash flows identified, for example, via a report detailing the percentages, amounts, etc. of loans with various characteristics.

In step 418, the client provides feedback regarding the cash flows it is interested in, if any, for backing REMICs, REMIC classes or new MBS-like securities. For example, an investor could choose the bucket or type of cash flow that they are interested in by notifying the REMIC issuer or securitization shelf. In step 420, pseudo pools are created based on predetermined pooling rules, and the identified cash flows are directed into the applicable pseudo pools. The contributing loan pools remain intact. The creation of pseudo pools may involve an optimization algorithm that tries to form pseudo pools from the available collateral so as to produce the most valuable or desirable group of securities backed by the pseudo pools. The value or desirability of a pseudo pool may be related in whole or part to specific factors, attributes, or characteristics of the loans pooled into a pseudo pool that provides the cash flow for the security. In the embodiment shown, the creation of pseudo pools is based on feedback received from the client, in step 418, which may include desired loan factors, attributes, or characteristics. After the client-requested pseudo pools have been formed, there will typically be leftover loans in the loan pools that do not have any of the desired characteristics. In one embodiment, these leftover loans are pooled and their cash flows directed to a separate pseudo pool that supports a separate security class or security, which may be unissued. In step 422, the pseudo pools are used to back REMIC classes and the desired REMIC (or new MBS-like security) is created. As previously discussed, a REMIC class may be backed by a single pseudo pool or by a combination of pseudo pools.

One of ordinary skill will recognize that the steps shown in FIG. 4 may be changed, deleted, or supplemented without departing from the principles of the present disclosure. For example, steps 416 and 418 may be deleted, such that the pseudo pools and REMIC classes are formed without client input. In such an embodiment, pseudo pools and REMIC classes may be formed based on market demand or predicted market value.

Although the above described embodiments use existing loan pools to provide specific cash flows to back new REMIC classes or new MBS-like securities, other embodiments of methods and systems consistent with the disclosed embodiments may create new Giant MBSes and/or groups of collateral for the same purpose, subject to compliance with privacy laws and regulations. Instead of analyzing existing loan pools to identify cash flows and the loans that generate them to ultimately back a REMIC class or a new MBS-like security, other embodiments analyze existing Giant MBSes to identify loan pools in the Giant and, if possible, the loans within the loan pools. Pseudo pools may therefore be formed from multi-tiered securities like Giants and not only from loan pools.

Figure 5:
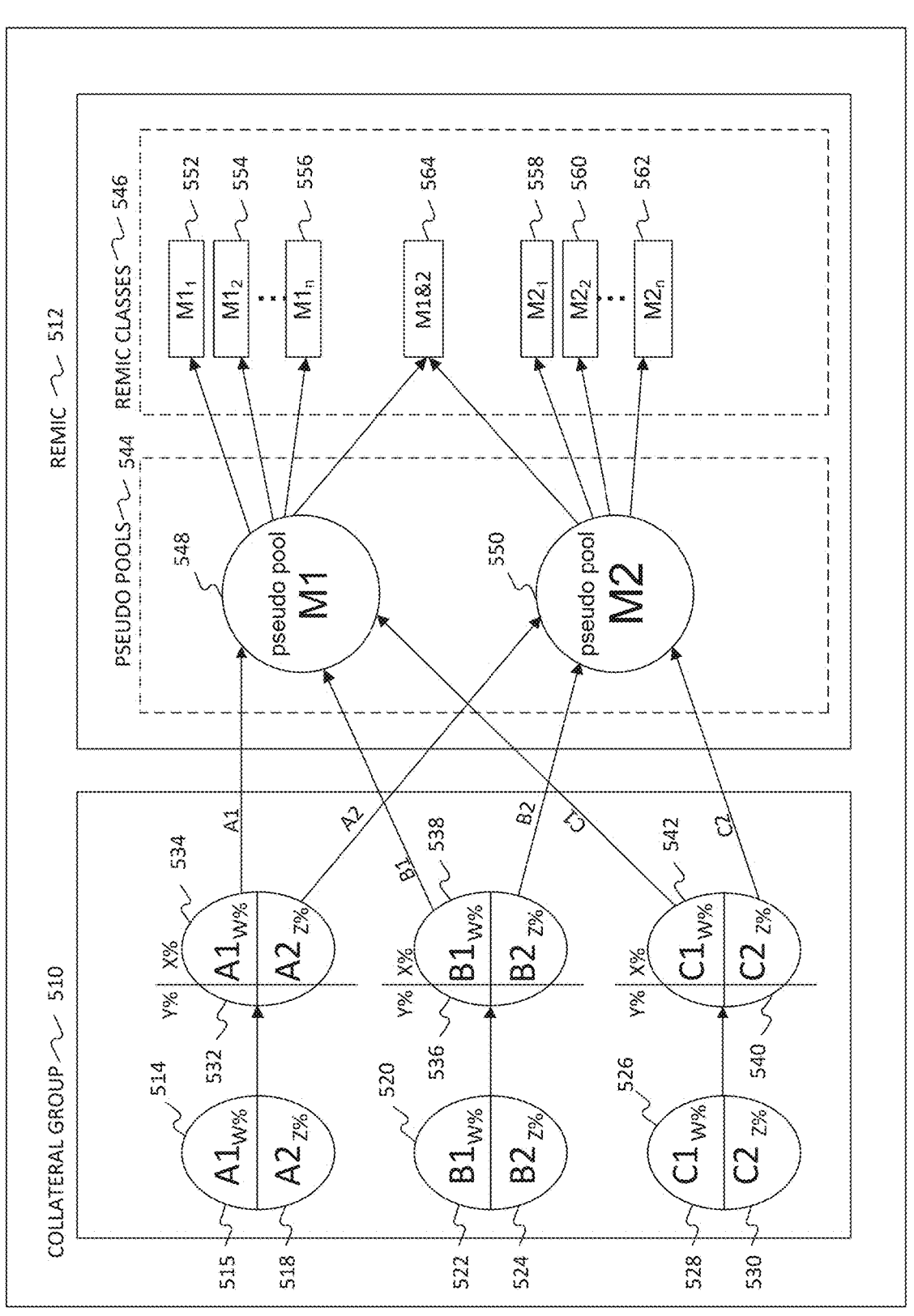
FIG. 5 is a block diagram illustrating an exemplary redirection of loan level cash flows associated with a loan pool for a group containing loan pools with identified cash flows, in accordance with the principles of the disclosed embodiments.

In the embodiment of FIG. 5, loans pools are analyzed and cash flows are identified before they are placed in collateral group 510. This allows the composition of loan pools in collateral group 510 to be optimized to support the desired pseudo pools 544. Analyzing the loan pools before forming a group that will supply the REMIC collateral allows tailoring the creation of collateral group 510 so that it contains loan pools with similar or complimentary pools of mortgage loans with desired characteristics. For example, loan pools containing a high percentage of mortgage loans originated in Florida may be placed in a group to support Florida-originated MBS. As another example, the loan pools for collateral group 510 could be chosen to minimize the size of the remainder class, which has loans with characteristics that do not interest potential REMIC investors. In addition, analyzing the loan pools before placing them in the group 510 allows a buyer wishing to purchase a conventional pro rata REMIC to have information regarding the characteristics of the mortgage loans contained in the pro rata share of the Giant MBS backing the conventional REMIC.

The cash flows of the loan pools used to populate the group 510 of the collateral group 510 are directed to pseudo pools 544, which represent the sources for directing the loan pools cash flows to specific securities without dissembling the loan pools themselves. In FIG. 5, the group 510 contains three loan pools, loan pool A 514, loan pool B 520, and loan pool C 526. Each loan pool has been analyzed, (which may involve optimization techniques), and its cash flows identified before being placed in group 510, as shown by the pool divisions of each loan pool. Specifically, FIG. 5 shows loans $A_1$ 516 and $A_2$ 518 within loan pool A 514, with loan $A_1$ 516 accounting for w % of loan pool A 514, and loan $A_2$ 518 accounting for z % of loan pool A 514. Further, loan pool B 520, contains loans $B_1$ 522 and $B_2$ 524, with loan $B_1$ 522 accounting for w % of loan pool B 520, and loan $B_2$ 524 accounting for z % of loan pool B 520. Loan pool C 526 contains loans $C_1$ 528 and $C_2$ 530, with loan $C_1$ 528 accounting for w % of loan pool C 526, and loan $C_2$ 530 accounting for z % of loan pool C 526. As with the other examples, the percentages w % and z % are arbitrary illustrations, and need not be the same for each loan pool.

FIG. 5 illustrates an example in which pro rata portions (Y %) 532, 536 and 540 of each loan pool are unavailable to back REMIC 546, for example, in the case where holders purchase conventional securities backed by Y % pro rata portions before or after the loan pools were analyzed and the cash flows identified. In this embodiment, the MSB 512 does not illustrate a collateral division because the cash flows within each loan pool have already been identified in the group 510.

The REMIC group 512 includes pseudo pools 544, such as pseudo pool M1 548 and pseudo pool M2 550. The cash flows identified in the group 510 are directed into the pseudo pool that backs the REMIC classes corresponding to the cash flows. As shown in FIG. 5, cash flows $A_1$ 516, $B_1$ 522, and $C_1$ 528 are directed into pseudo pool M1 548; and cash flows $A_2$ 518, $B_2$ 524, and $C_2$ 530 are directed into pseudo pool M2 550. As shown, pseudo pools may include multiple cash flows from multiple loan pools.

Similar to what was mentioned with respect to FIG. 3, determining which loan pools 514, 520, and 526, to include in a collateral group 510 used to produce desired REMIC classes 546, and/or determining which loans to include in a loan pool, such as loan pools 514, 520, or 526 to produce subgroups 544 that will produce the most desirable cash flows for backing REMIC classes 546, are difficult and complex problems. Some embodiments consistent with the present disclosure may use a pooling optimization model to choose loan pools for group 510 and/or allocate collateral loans to pseudo pool 544 underlying REMIC classes 546 so as to maximize or minimize a specific characteristic(s) of the cash flows of REMIC classes 546.

The participation percent for each collateral loan pool 514, 520, and 526 for the embodiment shown in FIG. 5 is determined using the same equation provided for FIG. 2 and FIG. 3. To determine the participation percent of a particular loan within a pseudo pool, the percentage of the loan pool included in the pseudo pool is multiplied by the percentage of the loan pool assigned to the REMIC group. For example, the participation percent of loan $A_1$ (516) within pseudo pool M1 (548) is calculated as follows:

$$\text{Participation Percent (Loan } A_1)=w \text{ \% } (A_1 \text{ 516)*}X\text{ \%}$$
$$\text{(Loan Pool } A \text{ 514).}$$

Likewise, the participation percent of loan $A_2$518 within pseudo pool M2 550 is calculated as follows:

$$\text{Participation Percent (Loan } A_2)=z \text{ \% } (A_2 \text{ 518)*}X\text{ \%}$$
$$\text{(Loan Pool } A \text{ 514).}$$

The participation percentages for loans $B_1$ 522, $B_2$ 524, $C_1$ 528, and $C_2$ 530 are calculated in the same manner.

The pseudo pools 544 direct the cash flows from the collateral loan pools into various classes of a REMIC 546, such as classes $M1_1$ 552 through $M1_n$ 556, M1 &2 564, and $M2_1$ 558 through $M2_n$ 562.

Figure 6:
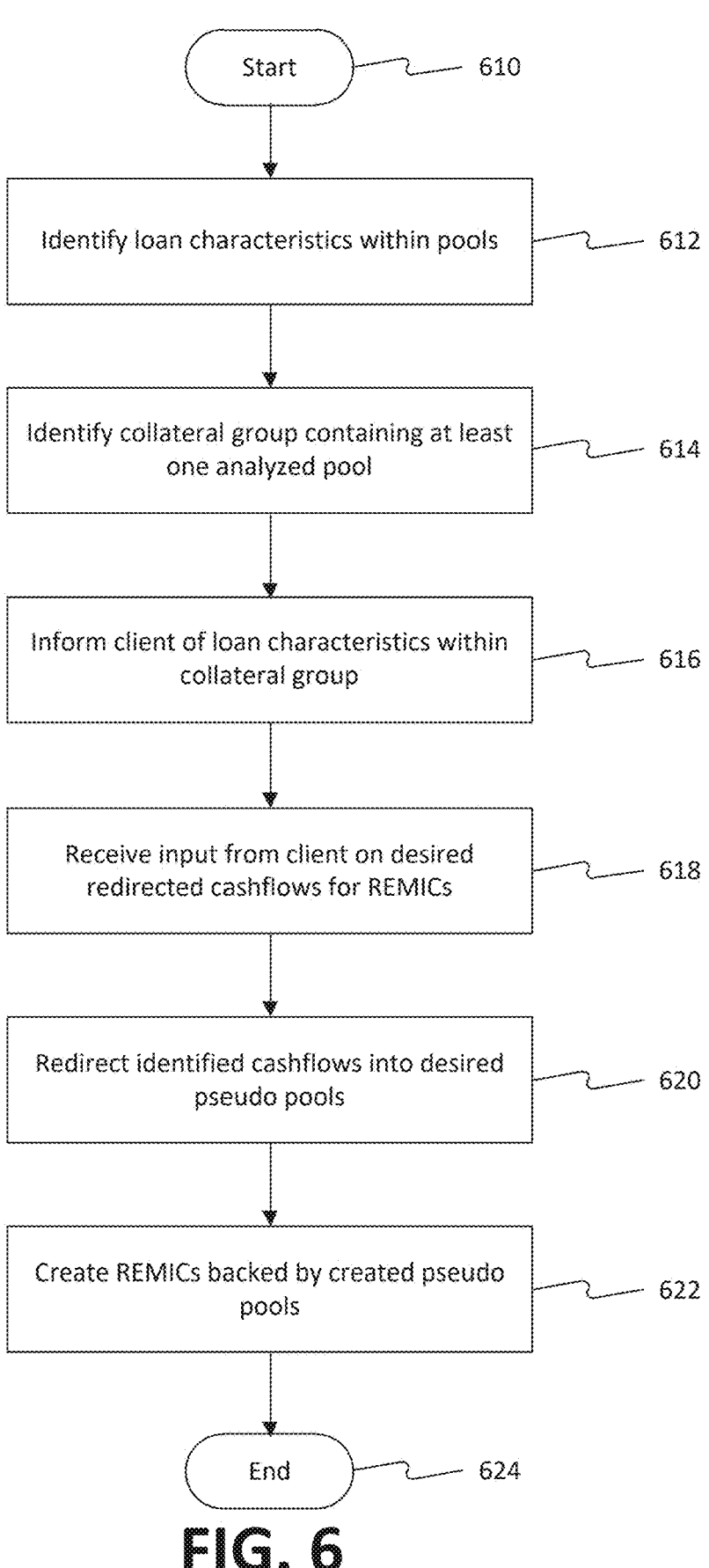
FIG. 6 is a flow chart of exemplary steps for redirecting loan level cash flows associated with a loan pool for a group containing loan pools with identified cash flows, in accordance with the principles of the disclosed embodiments.

FIG. 6 is a flow chart of exemplary steps for directing cash flows from loan pools having identified cash flows, consistent with the present disclosure. Although described using an MBS, the cash flow direction depicted in FIG. 6 may be similarly performed for any MBS-like security.

In step 612, a group of loan pools is analyzed and specific characteristics within each loan pool are identified. As previously discussed, there are many factors and characteristics that can be used to identify cash flows and the underlying loans that generate them within a loan pool, and any one characteristic or combination of characteristics can be used to screen the loans underlying a loan pool. In one embodiment, a software application searches and analyzes a database containing information about the loans in a loan pool, and identifies the loans having the characteristics supplied as input for the database search. The choice of loan pools to include in the collateral group may involve an optimization algorithm that tries to select loans from the available loan pools so as to form a group that will produce valuable or desirable securities backed by the provided collateral.

In step 614, a group containing at least one loan pool from the group of analyzed loan pools is created for use as collateral. By choosing loan pools having certain desired characteristics for inclusion, the collateral group can be customized and optimized to support a desired REMIC class or classes. For example, for a desired REMIC issue containing: 1) a seven-year adjustable-rate mortgage cash flow REMIC class, and 2) a vacation home, 15-year fixed-rate mortgage cash flow REMIC class, the available group of loan pools may be analyzed to identify those comprised of at least 40% seven year adjustable rate mortgages and/or at least 15% 15-year fixed rate vacation home mortgages, and the identified loan pools may then be placed in the collateral group associated with the desired REMIC. One of ordinary skill will recognize that these identification thresholds (e.g., 40% and 15%) are exemplary and may be adjusted to optimize the selection of loans for inclusion in the pseudo pool that backs a desired REMIC. One embodiment consistent with the present disclosure uses a database query application to identify loan pools containing mortgages having specific characteristics.

In step 616, a client, such as an investor, a holder of a loan pools in the collateral group, or a securities issuer, is informed of the predicted cash flows that were identified in each loan pool available for the collateral group. Then, in step 618, the client provides feedback regarding what predicted cash flows it is interested in, if any, for backing an MBS or a REMIC class. That is, the type of predicted cash flow is tied to the type of mortgage required to back the REMIC class or MBS-like security. In step 620, pseudo pools are created and the identified cash flows are directed into the applicable pseudo pools. In the embodiment shown, the creation of pseudo pools, and the selection of loans for inclusion in the collateral group is based on feedback received from a client or clients, but in other embodiments, client participation is not necessary (e.g., steps 616 and 618 may be replaced with optimization steps, or eliminated). In yet other embodiments, loans are selected for collateral and pseudo pools and REMIC classes are created based on marketing expectations, perceived or predicted market demand, or other factors.

In step 622, the pseudo pools back the desired REMIC, REMIC classes, or new MBSes that are created. A REMIC or REMIC class may be backed by a single pseudo pool or by a combination of pseudo pools.

In another embodiment consistent with the disclosed embodiments, customized Giant MBSes may be created based on the analysis and identification of cash flows in loan pools of MBSes and/or an unsecuritized group of loans, and the Giant MBSes may be used to create a collateral group whose cash flows are used to back REMIC classes. The creation of customized Giant MBSes may involve an optimization algorithm that tries to form Giant MBSes from the available mortgage loans so as to produce a Giant MBS that will produce the most valuable or desirable group of securities backed by the Giant MBS. The Giant MBS structure is used to aggregate, from available mortgage loans, mortgage loans having specific characteristics, such as mortgage loans with geographic diversity, or mortgage loans with a geographic concentration, or mortgage loans with short weighted average remaining maturities (WARM). For example, an issuer may perceive that there is desirable value in a pool that is structured to reduce the prepayment variation (achieved through greater geographic diversity), or that there is desirable value in a pool with short WARM. In some embodiments, several custom-built Giant MBSes (or portions thereof) may be combined, and the specific cash flows from these Giant MBSes may be directed to REMIC class securities or other new MBSes.

Figure 7:
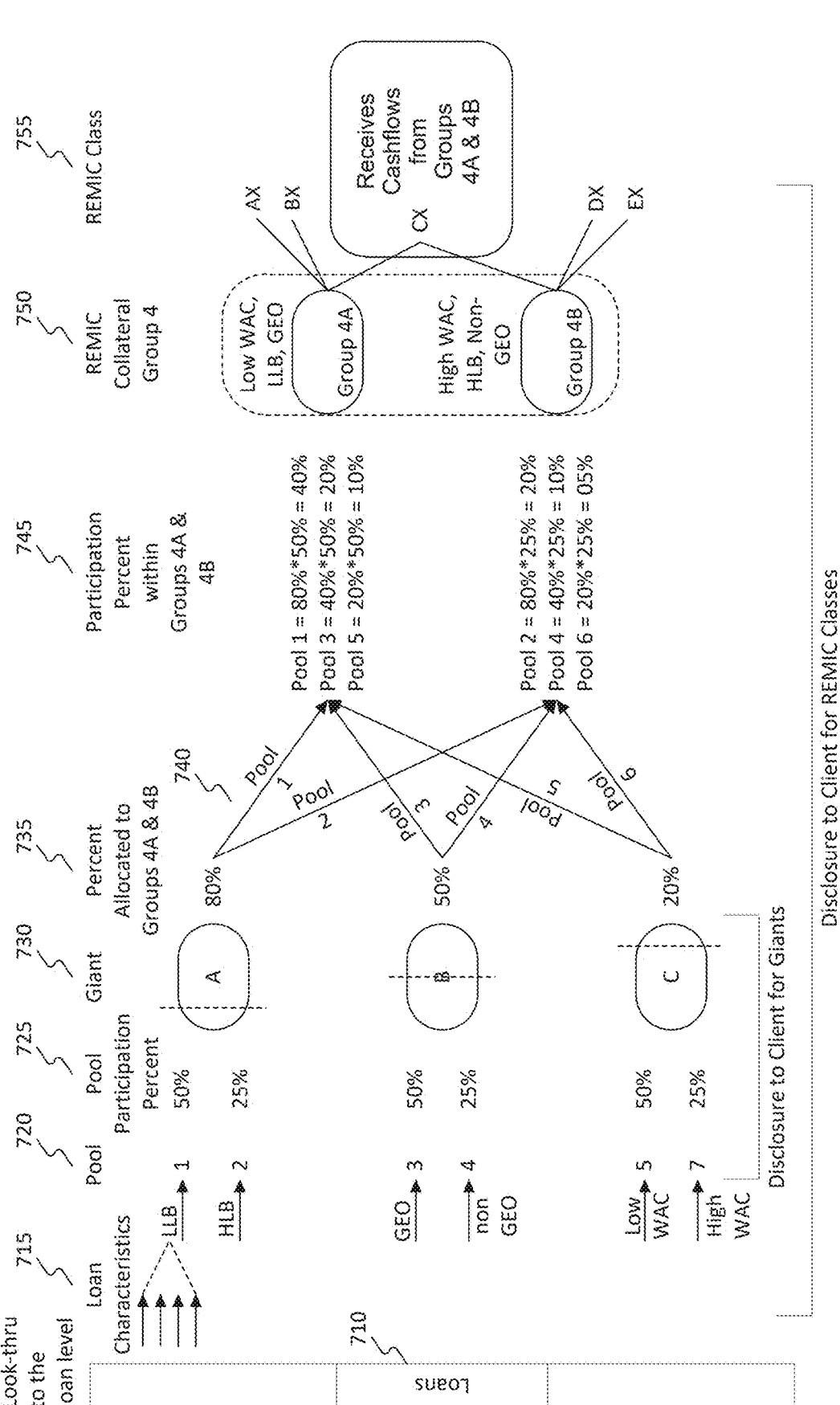
FIG. 7 is a block diagram illustrating an exemplary direction of partial pool level cash flows associated with several Giant MBSes, in accordance with the principles of the disclosed embodiments.

FIG. 7 is another block diagram illustrating an exemplary directing of cash flows for a collateral group containing three Giant MBSes in accordance with the principles of the disclosed embodiments. FIG. 7 depicts an embodiment using a Giant MBS, but the redirection depicted in FIG. 6 may be similarly performed for a traditional MBS, as explained above with respect to FIGS. 2-5. In such an embodiment, the groups may represent cash flows from different mortgages of the pool backing the MBS rather than cash flows from different MBSes backing the Giant MBS.

In the example shown, the goal is to create a REMIC with classes 755 backed by a collateral group 750 having two groups: Group 4A that represents cash flows from desirable mortgage loans characterized by Low Weighted Average Coupon (WAC), LLB, and being within a specified geographic origination area (GEO) or location group, and group 4B that represents cash flows from less desirable mortgage loans characterized by High WAC, HLB, and being outside the specified geographic origination area. To accomplish this, the mortgage loans 710 that comprise Giant MBSes 730 are identified by loan characteristics 715, such as Low Loan Balance (LLB) and High Loan Balance (HLB); within a specified GEO and not within a specified GEO; and Low Weighted Average Coupon (WAC) and High WAC. The mortgage loans are formed into six different pools 720 corresponding to their identified characteristics and the Giant they back. The pool participation percentage for each characteristic within its Giant MBS 730 is shown under pool participation percent 725. For example, 50% of the loans in Giant A have the LLB characteristic. Assigning the loans into pools 720 and groups 750 may involve techniques for optimizing the desirability of the resulting REMICs, which may be a complex problem because, among other things, a given loan may have characteristics the qualify it for inclusion in more than one pool 720, so a choice must be made as to the most desirable placement of the loan. As shown in FIG. 7, the pools are allocated according to their characteristics to either group 4A or group 4B as indicated by arrows 740.

The percentage 735 of each Giant MBS 730 allocated to the REMIC groups, which are considered the REMIC Collateral group 750, is multiplied by the pool participation percent 725 of each characteristic within the Giant MBSes to determine each pool's participation percent 745 within groups 4A and 4B.

REMIC classes 755 AX and BX are backed by the Low WAC, LLB, GEO or location group mortgage pools represented by group 4A. REMIC classes DX and EX are backed by the High WAC, HLB, non-GEO mortgage pools represented by group 4B. REMIC class CX is backed by the mortgage pools represented by both groups 4A and 4B. The Giant MBSes 730 remain intact, yet a purchaser or investor may invest in just the Low WAC, LLB, GEO cash flows contained in Giant MBSes 730 by purchasing REMIC classes AX, BX, or CX. Similarly, a purchaser may invest in just the Giant MBSes' High WAC, HLB, and non-GEO cash flows without collapsing the Giant MBSes via REMIC classes DX, EX, and CX. Because Giant MBSes 730 are not disaggregated in forming the REMIC groups, portions of the Giant MBSes may be available for investors or purchasers interested in a conventional investment in a pro rata portion of a Giant MBS.

Although not depicted, the embodiments of FIG. 7 may be combined with those of FIGS. 2-5. In such a combination, pseudo pools of loans may be formed using identified loans from identified MBSes that back a Giant MBS or other multi-tiered MBS-like security. Accordingly, by recursively identifying smaller components of the multi-tiered security to the individual loan level, embodiments of the present disclosure provide greater flexibility in structuring pseudo pools than previously available.

FIG. 8 is a block diagram illustrating exemplary logical entities underlying a software system embodiment consistent with the disclosed embodiments. One of ordinary skill in the art will recognize that the logical entities may represent database entries and object-oriented programming objects that can be used to implement a system consistent with the present disclosure, such as an object-oriented software application that accesses a relational database. One of ordinary skill will also recognize that multiple instances of each logical entity may be needed for each instantiation of an embodiment consistent with the present disclosure.

FIG. 8 depicts an embodiment using Giant MBS, but the logical entities depicted in FIG. 8 may instead represent a traditional MBS or a Giant MBS. In such an embodiment, the logical entity 810 may comprise a Directed Cash Flow MBS logical entity or a Directed Cash Flow Giant MBS logical entity, the logical entity 835 may identify loan pools within the MBS that comprise groups or MBSes within the Giant MBS that comprise groups, and the logical entity 840 may identify individual pools within a particular group or individual MBSes within a particular group.

As shown, a Directed Cash Flow Pool logical entity 810 includes several information fields or attributes, including a Pool Number, a CUSIP Number that uniquely identifies the pool, a Participation Percentage available for use with directed cash flows, (such as X % portion 322 of loan pool A 314 in FIG. 3), and a Group Number denoting the pool's collateral group. A pool may have a unique identification used by the securitization program or issuer, and this identification is called the pool number. The pool number, however, may not be unique across different issuers.

In the example shown, a Directed Cash Flow Pseudo Pool logical entity 830 includes a Pseudo Pool Name field and a Pseudo Pool Description field. As shown in entity note 835, the Directed Cash Flow Pseudo Pool logical entity 830 identifies the pseudo pool collateral loans, such as pseudo pool N1 350 in FIG. 3. A line 817 connecting the Directed Cash Flow Pool logical entity 810 and Directed Cash Flow Pseudo Pool logical entity 830 represents a relationship between the two entities. The notation "1 . . . *" where line 817 connects to the Directed Cash Flow Pool logical entity 810 signifies that at least one, or more, pool is associated with each pseudo pool. The notation "*" where line 817 connects to the Directed Cash Flow Pseudo Pool logical entity 830 signifies that zero or more pseudo pools may be associated with each pool.

In the example shown, a Directed Cash Flow Pseudo Pool Criteria logical entity 820 includes a Disclosure Characteristic field that indicates a mortgage loan characteristic or factor, an Operator Field that indicates, for example, a logical, Boolean, or mathematical operation or relationship, and a Value field that indicates a quantity or threshold. As shown in entity note 825, the Directed Cash Flow Pseudo Pool Criteria logical entity 820 captures the Pseudo Pool criteria in a quantifiable format, such as may be used to query a database or otherwise identify specific mortgages. For example, a pseudo pool criteria to identify mortgages for properties that are occupied by the owner may be specified as "Occupancy=Owner," where the Disclosure Characteristic is "Occupancy," the Operator is "=," and the Value is "Owner."

Line 827 connecting the Directed Cash Flow Pseudo Pool Criteria logical entity 820 and Directed Cash Flow Pseudo Pool logical entity 830 represents a relationship between the two entities. As noted above, the notation "1 . . . *" where line 827 connects to the Directed Cash Flow Pseudo Pool Criteria entity 820 signifies that at least one, or more, criteria may be associated with each pseudo pool. The notation "1" where line 827 connects to the Directed Cash Flow Pseudo Pool logical entity 830 signifies that one pseudo pool is associated with each criterion.

A Directed Cash Flow Loan logical entity 840 includes a Loan Number field that uniquely identifies the loan, a Participation Percentage field that indicates the percentage of the loan available for use with pseudo pools, a Deal Number field that indicates a corresponding number for a group of REMIC classes, and a Group Number field that indicates a corresponding pseudo pool number for directing cash flow. As previously discussed, the disclosed embodiments may process MBSes, Giant MBSes, or other securities. Thus in some embodiments, item 840 may be a Directed Cash Flow Loan Pool or a Directed Cash Flow MBS Pool logical entity. As shown in entity note 845, the Directed Cash Flow Loan logical entity 840 identifies the mortgage loans that back a pseudo pool. Line 837 connecting the Directed Cash Flow Loan logical entity 840 and Directed Cash Flow Pseudo Pool logical entity 830 represents a relationship between the two entities. As noted above, the notation "*" where line 837 connects to the Directed Cash Flow Loan entity 840 signifies that zero or more loans may be associated with each pseudo pool. The notation "1" where line 837 connects to the Directed Cash Flow Pseudo Pool logical entity 830 signifies that one pseudo pool is associated with each loan for the example shown.

Pooling Optimization

Figure 9:
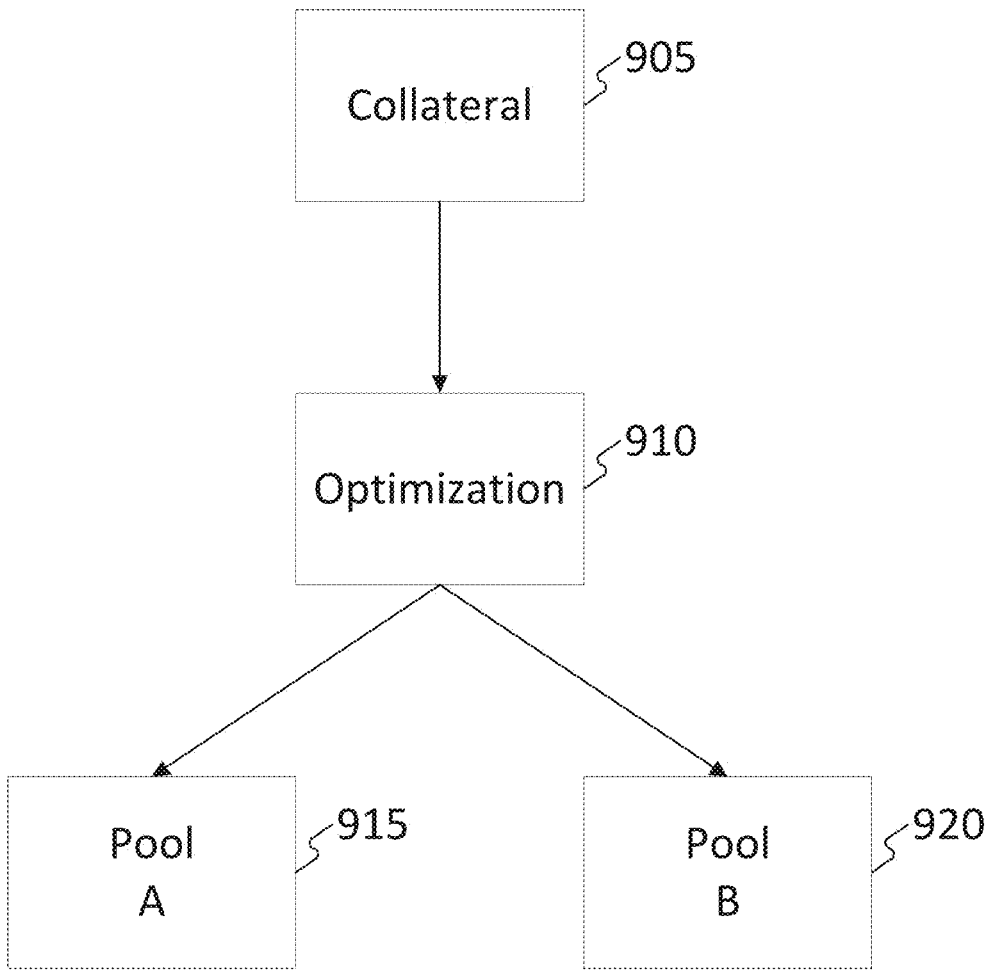
FIG. 9 is a block diagram representing an exemplary pool optimization architecture consistent with the principles of the disclosed embodiments.

FIG. 9 is a block diagram representing an exemplary pool optimization architecture consistent with the principles of the present disclosure. As shown, an optimization process 910 receives as input collateral 905, such as a pool of mortgage loans, and produces as output optimized pseudo pools, such as pseudo pool 915 and pseudo pool 920, which may, for example, comprise mortgage loans from the input collateral 905 separated into two or more defined pools according to a specific set of criteria. In one embodiment, optimization process 910 is designed, for a given set of input collateral loans, to group the loans into pseudo pools that most nearly maximize the most valuable or otherwise desirable cash flows among the collateral 905 for association with mortgage-backed securities, where the cash flows are generated by loans having specific characteristics or attributes. Optimization process 910 may use one or more algorithms or strategies, perhaps in the alternative, to arrive at a pooling solution(s). Optimization process 910 may be implemented in software, hardware, or a combination of the two.

In one embodiment, optimization process 910 utilizes rules engine technology. Rules engine technology provides the ability to centralize business logic, such as pooling criteria, so that it can be easily changed (thus changing the operation of optimization process 910), for example, to quickly meet new customer demands, regulatory changes, and competition in the marketplace.

Optimization process 910 may be implemented in method 400 of FIG. 4 or in method 600 of FIG. 6 to optimize assignments at step 418 or step 618, respectively, in lieu of or in combination with client input.

Figure 10:
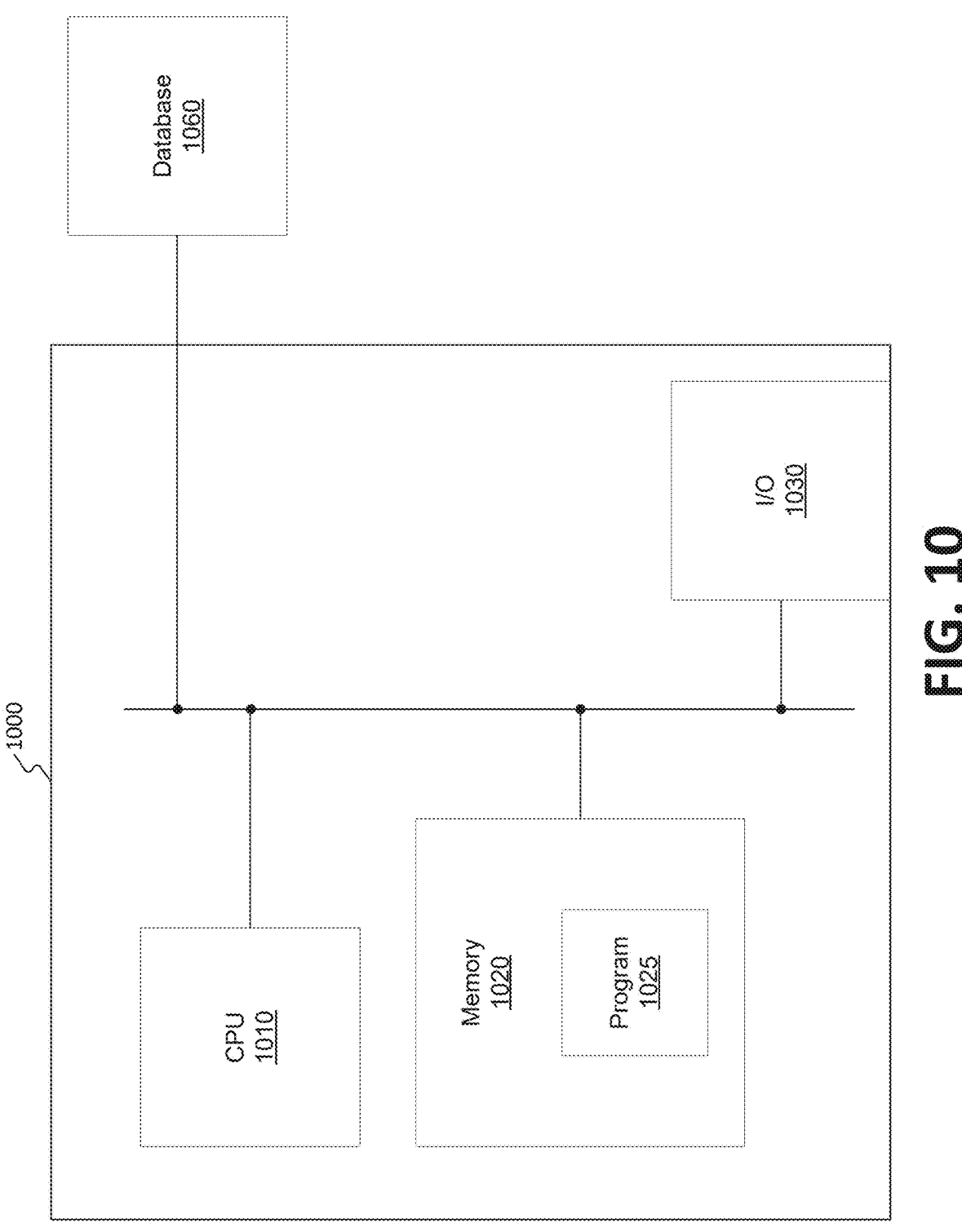
FIG. 10 illustrates an exemplary computing system that can be used to implement embodiments of the disclosed embodiments.

FIG. 10 illustrates an exemplary computing system 1000 that can be used to implement embodiments of the present disclosure. The components and arrangement, however, are not critical to some embodiments of the present disclosure. One of ordinary skill will recognize that embodiments of the present disclosure may be implemented by computers or workstations organized as shown, organized in a distributed processing system architecture, or organized in myriad suitable combinations of software, hardware, and/or firmware.

Disclosed systems, such as computing system 1000, and the processes implemented using system 1000, provide for a plurality of improvements in computer systems supporting security interest generation and maintenance. Whereas traditional computer systems and processes were unable to determine loan-level information within loan pools or in Giant MBSes and other MBS-like products, the disclosed embodiments provide capabilities for extracting such information with distributed database technology. In addition, the disclosed embodiments provide capabilities for multi-tiered determination of loan levels, e.g., by determining the loan pools included in a Giant MBS and then determining the loans within each loan pool. Previous systems had only considered a single-tiered determination. Finally, the disclosed embodiments provide for increased flexibility by generating potential disclosure documents for numerous iterations of pseudo pools, allowing a more robust selection process than previously available.

As shown, system 1000 includes a number of components, such as a central processing unit (CPU) 1010, a memory 1020, an input/output (I/O) device(s) 1030, and a database 1060 that can be implemented in various ways. For example, an integrated platform (such as a workstation, personal computer, laptop, etc.) may comprise CPU 1010, memory 1020, and I/O devices 1030. In such a configuration, components 1010, 1020, and 1030 may connect through a local bus interface and access to database 1060 (implemented as a separate database system) may be facilitated through a direct communication link, a local area network (LAN), a wide area network (WAN) and/or other suitable connections. System 1000 may represent a computer in a local environment or a server in a cloud-based environment.

CPU 1010 may be one or more known processing devices, such as a single or multicore microprocessor for a mobile device, desktop computer, or server computer. In some embodiments, CPU 1010 may include one or more processing components of a cloud computing system. Memory 1020 may be one or more storage devices configured to store information used by CPU 1010 to perform certain functions, operations, and steps related to embodiments of the disclosed embodiments. Memory 1020 may be a magnetic, semiconductor, tape, optical, or other type of storage device. In one embodiment, memory 1020 includes one or more software application programs 1025 that, when executed by CPU 1010, perform various processes consistent with the disclosed embodiments. For example, memory 1020 may include a cash flow identification software application 1025 that, when executed by CPU 1010, determines the loans within a loan pool and retrieves specified characteristics of those loans. Memory 1020 may also include other programs that perform other functions consistent with embodiments of the present disclosure, such as a program that groups identified loans into pseudo pools and verifying those pseudo pools using automated rules.

Methods, systems, and articles of manufacture consistent with the disclosed embodiments are not limited to programs configured to perform dedicated tasks. For example, memory 1020 may be configured with a program 1025 that performs several functions consistent with the present disclosure when executed by CPU 1010. For example, memory 1020 may include a software application program that both searches database 1060 for loan characteristics and groups loans of different loan pools into a pseudo pool. Alternatively, CPU 1010 may execute one or more programs located remotely from system 1000. For example, system 1000 may access one or more remote programs that, when executed, perform functions related to embodiments of the disclosed embodiments. The configuration and number of programs implementing processes consistent with the present disclosure are not critical to some embodiments of the present disclosure.

Memory 1020 may be also be configured with an operating system (not shown) that performs several functions well known in the art when executed by CPU 1010. By way of example, the operating system may be a Microsoft Windows™, Unix™, Linux™ an Apple™ operating system such as MAC OSX™, Personal Digital Assistant operating system such as Microsoft CE™, or other operating system such as server, smartphone, and tablet operating systems. The choice of operating system, and even to the use of an operating system, is not critical to some embodiments of the present disclosure.

I/O device(s) 1030 may comprise one or more input/output devices that allow data to be received and/or transmitted by system 1000. For example, I/O device 1030 may include one or more input devices, such as a network connection, keyboard, touch screen, mouse, microphone, and the like, that enable data to be input or received from a user. Further, I/O device 1030 may include one or more output devices, such as a network connection, display screen, printer, speaker devices, and the like, that enable data to be output or presented to a user. The configuration and number of input and/or output devices incorporated in I/O device 1030 are not critical to some embodiments of the present disclosure.

Database 1060 may comprise one or more databases that store information and are accessed and managed through system 1000. By way of example, database 1060 may be an Oracle™ database, a Sybase™ database, or other relational database. One embodiment described above uses database 1060 to store information about the mortgage loans in a loan pool, a Giant MBS, or other MBS-like securities. Systems and methods of the disclosed embodiments, however, are not limited to separate databases or even to the use of a database as other organized collections of data or memory systems will serve as well.

In some embodiments, system 1000 may comprise a single computer or a plurality of computers connected via a local network, and/or via wide area network such as the Internet. System 1000 may include a plurality of CPUs 1010. In some embodiments, system 1000 may include one or more subsystems including a loan level system and a Web Portal system, to provide bidirectional communication and data transfer between one or more client terminals and system 1000. In many embodiments, such communication is enabled by the Internet, which enables the rapid, real time data transfer necessary to enable techniques disclosed herein and accomplish the disclosed advantages. For example, whereas prior, conventional systems operate using slower communication methods such as physical mail, facsimile, or telephone, modern systems implementing the techniques disclosed herein are necessarily rooted in Internet technology, to collect current information quickly from geographically dispersed locations, and to provide processed information in real time or near real time. Indeed, the disclosed techniques provide significant advantages resulting from the ability to receive and process real time data from geographically dispersed areas, analyze collected data, and provide validated, time-sensitive results, as a result of Internet connectivity.

In some embodiments, system 1000 may be configured to generate queries to one or more external systems to receive current data necessary to deconstruct loan pools, and validate pseudo pools for new REMIC structure creation. For example, system 1000 may be configured to access one or more of a securities database, loan database, contracts database, counterparty data database, public securities database, user authorization system, user provisioning system, user authentication system, monitoring system, enterprise service bus/layer, and shared data services.

As previously discussed, in some embodiments, system 1000 may process loan level collateral data, such as information for individual loans or other individual securities, to construct new REMIC structure files. For example, some embodiments may deconstruct a loan pool, a Giant MBS, or other MBS-like security into individual loans, retrieve information for each individual loan, and form new pseudo pools having the same certain characteristics or combination of characteristics. System 1000 may then analyze and validate one or more new REMIC structure files reflecting the newly formed sets of loans (i.e., pseudo pools) and send back a list of collateral to be submitted before deal settlement, along with any potential errors in the structure file. The system may then configure a payment processing system to automatically route funds associated with the individual loans to different accounts. System 1000 may generate such a REMIC structure while maintaining the original electronic security certificate having the individual loans (or an ownership portion thereof).

As time passes since origination of a given loan, the expectations for future borrower prepayment behavior may change. Loan characteristics can transform significantly over time between loan origination and points in time that are years after origination, resulting in mid-life loans that have higher or lower value to investors than initially perceived. For example, a decreased loan balance may indicate that the borrower has a reduced likelihood of prepayment, thereby increasing the value of the loan to the secondary market. Furthermore, as interest rates and housing markets change, so too may the value of a loan having a variable rate, or LTV (loan-to-value) ratios for individual loans. Loans may also develop varying refinance expectations over 5-10 years, as refinance opportunities have come and gone for the borrowers. Thus, loans that were initially grouped in a loan pool or Giant MBS may have substantially different characteristics after a few years. Because MBS-like securities are valued based in large part on the characteristics of the underlying collateral, changes in characteristics introduce the opportunity to value the collateral differently than when it was originally pooled.

For discussion purposes, collateral is discussed as being mortgages, or loans for real property. It is to be understood, however, that the collateral underlying Asset Backed Securities (ABS) which may include MBSes, Giant MBSes, and REMICs can include a diverse array of loans including, for example, auto loans, student loans, commercial loans, consumer loans, and any other security interest for which there is a secondary market or interest in redirecting cash flows for individual loans underlying a security interest certificate.

As previously discussed, in some embodiments, system 1000 may employ a pooling optimization engine (POE) to automatically identify loan groupings of individual loans, based on characteristics of the loans. For example, POE may determine that loans having certain characteristics at their origination were observed to change characteristic values by a certain percentage or amount, or that those loans developed certain other characteristics after certain periods of time. Using these mined trends and relationships, POE may predict future characteristics for the loans. Thus, in some embodiments, system 1000 may propose pseudo pools for new REMIC structures having individual loans grouped based on their expected characteristics at a certain future point in time.

Disclosed embodiments further provide techniques and loan level systems for generating data for redirecting cash flows associated with the individual loans underlying the loan pool or Giant MBS, without affecting the electronic certificate for the MBS-like security. Individual loans are grouped into pseudo pools, e.g., based on selected or pre-defined common characteristics. Thus, disclosed loan-level systems provide a new pseudo pool creation tool that allows users such as MBS, Giant, REMIC, and other MBS-like securities dealers to deconstruct issued pools (or issued MBSes and Giant MBSes) to the loan level and group the underlying loans into new pseudo pools to back a security or a REMIC class.

In some embodiments, disclosed systems and techniques provide a data template to a client, and receive a completed data template from the client. Disclosed systems may analyze the completed data template to prescreen the data for errors or inconsistencies in the data entries, and verify that the relationships between data entries conforms to a pre-defined set of rules that define valid pseudo pools. In some embodiments, the pseudo pools may correlate to rules for distributing payment amounts for the loans underlying the pseudo pools to different accounts/entities. The disclosed systems may output one or more data files which serve as inputs for a third-party system that issues REMIC structures, and in some embodiments the disclosed systems may automatically generate the REMIC structures or equivalent cash flow conduit data structures. Thereafter, the REMIC structure (or other cash flow conduit structure) may automatically configure one or more payment processing systems associated with loans underlying the loan pool, Giant MBS, or other MBS-like security and identified in the REMIC structure, to automatically partition and redirect payments received for the loans to the appropriate account.

In some embodiments, the pseudo pool creation tool may create unique loan identification numbers, or "Loan Sequence Numbers," in order to help track the cash flows from each loan in an active issued pool to its location in the newly formed pseudo pool. During deconstruction, each loan may be assigned a 12-digit Loan Sequence Number based on the pool number (e.g., A90123) and/or a loan identification number (e.g., 000001). A sample Loan Sequence Number may look like the following: A90123000001.

In some embodiments, the pseudo pool creation tool may utilize a specialized data structure, or a database table file such as a comma-separated value (CSV) file. The REMIC structure, backed by these newly formed pseudo pools, may include other deconstructed collateral or other MBSes and tranches.

In order to implement the disclosed techniques, system 1000 may provide a Web Portal, as described below. The Web Portal may allow users such as REMIC dealers to request deconstruction of collateral lists, upload and validate preliminary pseudo pools, form final and disclose on final pseudo pools, allow pseudo pools to be included in the REMIC structure file, and upload and automatically validate a REMIC structure. The system may also use the pseudo pools formed during this process to back pass-through securities such as Giant MBSes.

Figure 11A:
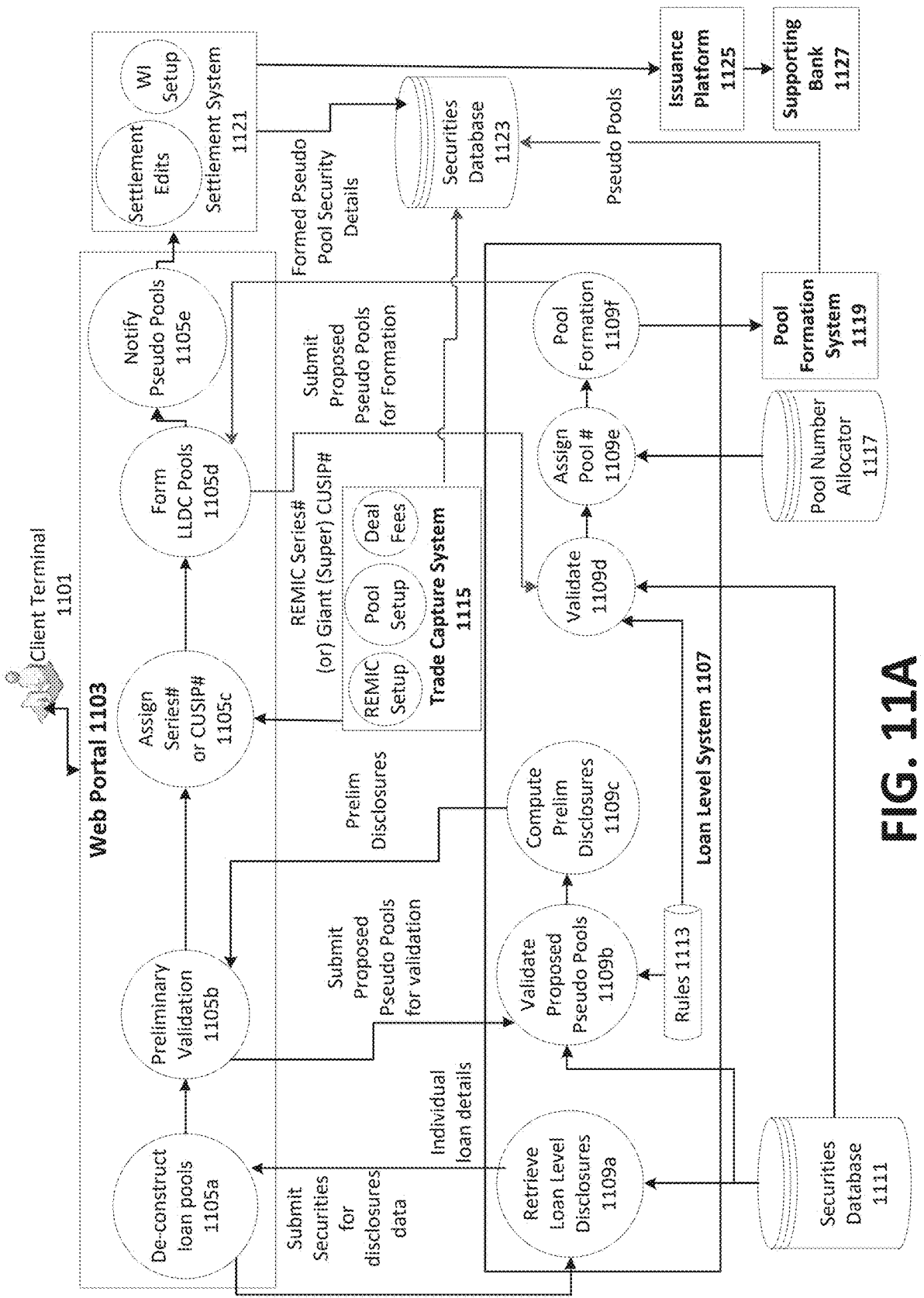
FIGS. 11A, 11B, 11C, and 11D depict block and flow diagrams for system components and techniques for generating data necessary for creating REMIC structure files using loan level information, consistent with disclosed embodiments.

FIG. 11A shows a high-level block and flow diagram of loan level systems and techniques for security deconstruction for obtaining loan level information. In some embodiments, such techniques may include subprocesses such as security deconstruction, analysis for loan level information, and pseudo pool validation. Such subprocesses may be performed prior to resecuritization and REMIC structure file creation.

As depicted in FIG. 11A, client terminal 1101 may interact with web portal 1103 to perform the deconstruction. Web portal 1103 may be configured to de-construct loan pools received from client terminal 1101 at step 1105*a*. For example, the securities may be submitted for retrieval of loan level disclosures from loan level system 1107.

Loan level system 1107 may obtain loan-level disclosures from one or more databases, e.g., securities database 1111, at step 1109*a*. Securities database 1111 may, for example, comprise one or more databases including information regarding publicly available securities. For example, loan level system 1107 may, based on information received from client terminal 1101 about the submitted pools, such as unique identifiers (e.g., CUSIPs), names of issuers of the pools, names of loan originators of loans in the pools, or the like, to determine identities of remote servers storing the one or more databases. Loan Level system 1107 may thus generate requests for loan-level disclosure including the unique identifiers and transmit the same to the remote servers identified using the unique identifiers. For example, a CUSIP for a first loan pool may be determined to be associated with Freddie Mac and a corresponding request including the CUSIP may be generated and transmitted to a Freddie Mac remote server while a CUSIP for a second loan pool may be determined to be associated with Fannie Mae and a corresponding request including the CUSIP may be generated and transmitted to a Fannie Mae remote server.

As further depicted in FIG. 11A, the loan-level disclosures obtained using the distributed search and retrieval described above may be returned to web portal 1103 for viewing by client terminal 1101. Client terminal 1101 may use the loan-level disclosures to submit one or more proposed pseudo pools of loans. Web terminal 1103 may be configured to perform preliminary validation of the proposed pseudo pool(s) at step 1105*b*. For example, the proposed pseudo pool(s) may be submitted to loan level system 1107.

Loan level system 1107 may validate the proposed pseudo pool(s) at step 1109*b*. For example, one or more rules may be applied to ensure that the proposed pseudo pool(s) are consistent with one or more requirements, as described below with respect to FIG. 11C. Loan level system 1107 may further compute preliminary disclosures (such as a disclosure document) for the proposed pseudo pool(s) at step 1109*c*. These preliminary disclosures may be returned to web portal 1103 for viewing by client terminal 1101.

As further depicted in FIG. 11A, client terminal 1101 may use the preliminary disclosures to decide whether to finalize the proposed pseudo pool(s). Finalization may proceed as follows. At step 1105*c*, web portal 1103 may receive one or more identifiers (such as a series number and/or a CUSIP) from trade capture system 1115. At step 1105*d*, web portal 1103 may initiate formation of the pseudo pool(s).

For example, web portion 1103 may submit the proposed pseudo pool(s) to loan level system 1107. Loan level system 1107 may again validate the proposed pseudo pool(s) (step 1109*d*); assign a pool number using, for example, pool number allocator 1117 (step 1109e); and form the pseudo pool(s) by communicating with a pool formation system 1119 (step 1109f).

Loan level system 1107 may return the pool security details to web portal 1103, e.g., for viewing by client terminal 1101. Web portal 1103 may further submit the finalized pseudo pool(s) to settlement system 1121 (step 1105e). Settlement system 1121 may cooperate with trade capture system 1115 and pool formation system 1119 to register the pseudo pool(s) in a securities database 1123. Additionally or alternatively, securities database 1123 may be managed by one or more financial entities underwriting the security (e.g., a REMIC class) backed by the pseudo pool(s).

As further depicted in FIG. 11A, settlement system 1121 may submit the pseudo pool(s) to an issuance platform 1125 for submission to supporting bank 1127. Accordingly, the pseudo pool(s) may be used to back a security (e.g., a REMIC class) as the appropriate cash flows have been directed to supporting bank 1127 using settlement system 1121.

Figure 11B:
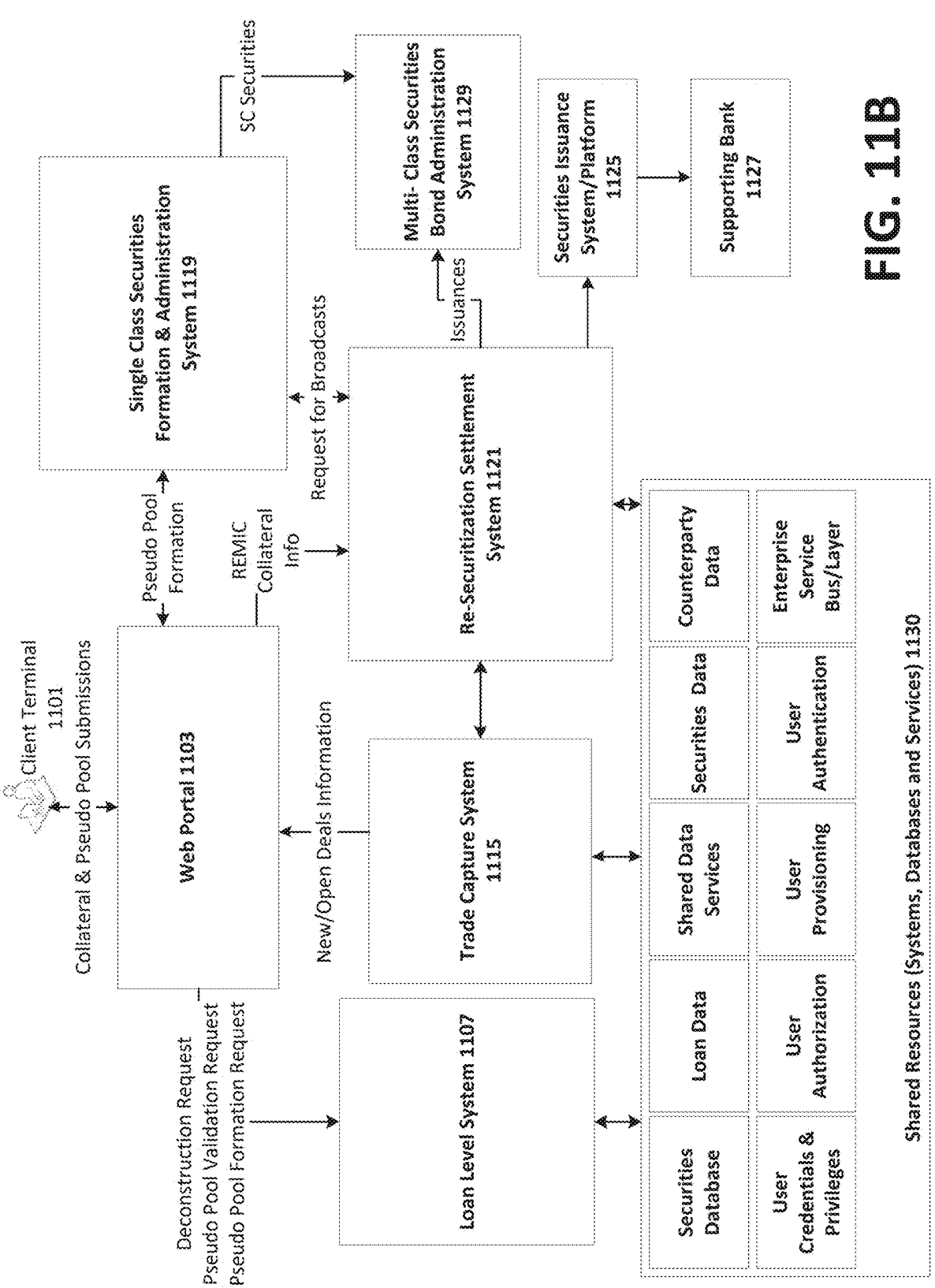

FIG. 11B is another block diagram of an exemplary system for single class security deconstruction, consistent with disclosed embodiments. As shown, Web Portal 1103 may be configured to receive, from a client terminal 1101, single class security submissions and pseudo pool submissions, perform monitoring and tracking functions, generate and provide user notifications and alerts, and perform REMIC pseudo pool collateral assignment functions, as discussed herein. In some embodiments, Web Portal 1103 may include or be included within a larger system, such as a loan level system 1107, a trade capture system 1115, a re-securitization settlement system 1121, a single class securities formation and administration system 1119, a multi class securities bond administration system 1129, and a securities issuance system/platform 1125. In some embodiments, such subsystems may be employed as software modules executed by one or more processors associated with Web Portal 1103.

As further depicted in FIG. 11B, loan level system 1107, trade capture system 1115, and re-securitization settlement system 1121 may access one or more shared resources 1130. Shared resources 1130 may include, for example, one or more securities databases (e.g., securities database 1111 of FIG. 11A), loan data (e.g., available in one or more databases), shared data services (e.g., a subscription service or other data collation service), securities data (e.g., available in one or more databases), counterparty data, an enterprise service (e.g., in embodiments where one or more of loan level system 1107, trade capture system 1115, and re-securitization settlement system 1121 are hosted, at least in part, on the same server farm), a user authentication service (e.g., a single sign-on (SSO) service or the like), a user provisioning service (e.g., a lightweight directory access protocol (LDAP), an active directory (AD), or the like), a user authorization service (e.g., an access control service or other like), and/or a user credentials and privileges service (e.g., a key distribution center, a credential service provider, or the like).

In some embodiments, deconstruction may refer to submitting a list of collateral (MBS or Giant MBS Pool Number, CUSIP, and/or Participating Par) to the Web Portal 1103, and receiving the list of pools and underlying loans (where loan-level data is published), as well as all publicly available loan-level disclosure information. The loan-level data elements may include, for example: CUSIP, deconstructed pool current UPB (pro rata), Loan Sequence Number, current investor loan UPB (pro rata), pooling category, term, coupon, payment delay, mortgage loan amount, amortization type, first payment date, maturity date, remaining months to maturity, loan age, loan-to-value, debt-to-income ratio, credit score, and the like.

In some embodiments, the system of FIG. 11B may be configured to deconstruct any issued security (MBS or resecuritizations) having publicly accessible loan level data. The deconstruction results may include a pooling category for each loan to assist in assigning them to compatible pseudo pools. In some embodiments, the pooling category may reference one or more loan level system pooling rules based on any publicly disclosed attribute or combination thereof, and defines the type of pseudo pool to which each loan can be contributed (e.g., a pseudo pool of loans with a certain initial interest rate or a pseudo pool of relocation loans that have certain restrictions on prepayment). Within pooling categories, loans may be further identified and selected based upon such characteristics as 30-year standard terms, a certain loan-to-value ratio, borrower credit score within a certain range, and any other characteristics that are identifiable or derivable from loan level information associated with the individual loans.

In some embodiments, Web Portal 1103 may configure a deconstruction output file to include a labelled yet blank column for a user to enter one or more unique pool identifiers. In some embodiments, the loan level system 1107 may prompt a user (e.g., through client terminal 1101) such as a REMIC dealer to enter a unique alphanumeric identifier to group the loans together to form pools of loans during the validation steps of the process.

Consistent with disclosed embodiments, Web Portal 1103 may allow for multiple iterations of MBS/Giant MBS deconstruction and preliminary pool validation, without affecting the underlying electronic certificate of the MBS/ Giant MBS, or without generating new security interests until a REMIC series is requested, to provide users such as REMIC dealers with an interactive and fast computer tool for exploring different pooling variations.

Figure 11C:
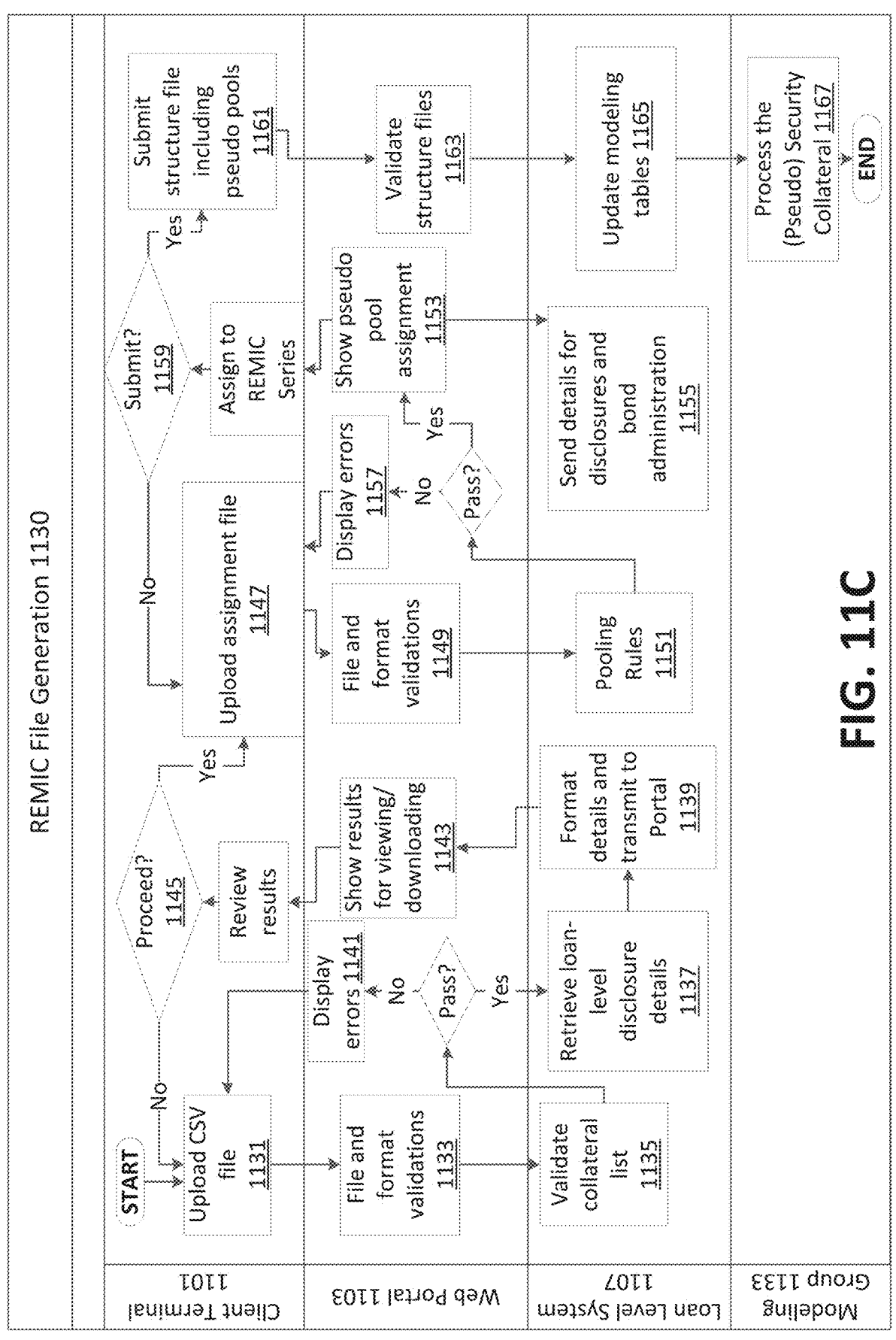

FIG. 11C shows a flowchart of an exemplary process 1130 for creating a REMIC backed by pseudo pools using a loan level system, consistent with disclosed embodiments. As shown, the process may begin when a client terminal 1101 uploads a CSV or similar file to Web Portal 1103 (step 1131), and Web Portal 1103 receives the uploaded file. For example, a user such as a REMIC dealer may upload a securities collateral list for a MBS or Giant MBS via a Web Portal web application to system 1100, for loan level disclosures deconstruction. The collateral deconstruction input file may be a comma separated values (CSV) format file, containing all of the collateral items (pools or Giants) for deconstruction. Deconstruction may be performed multiple times using the Web Portal 1103, to provide users with multiple lists of deconstructed loan and pool collateral.

The CSV file having the securities collateral list may include information such as a Pool Number in a first table column, a CUSIP number in a second column, and an original par amount in a third table column. In some embodiments, the original par amount may reflect a total amount being contributed to the REMIC. Web Portal 1103 may analyze the securities collateral list to verify that the data conforms to a required format (step 1133). For example, Web Portal 1103 may verify that the pool number is exactly 6 characters in length and uses alphanumeric characters, without special characters. Web Portal 1103 may also verify that the CUSIP number is exactly 9 characters in length, and uses alphanumeric characters without special characters.

Web Portal 1103 may also verify that the original par amount is indicated in whole numbers only, without decimals or special characters.

In some embodiments, the CSV file may include information in an additional portion of the file, such as in a fourth table column, indicating a collateral grouping, to identify which collateral is desired to be grouped into which Giant MBS. Web Portal 1103 may determine whether the CSV file includes any Giant MBS grouping value, to identify Giant MBS groups, to validate the collateral in a pre-selected group indicated by the user. Alternatively, if a pool number section or column is included in the CSV file, disclosed embodiments may assign the collateral to a previously formed Giant MBS.

In some embodiments, Web Portal 1103 may automatically initiate a subroutine for grouping the collateral, when Web Portal determines that the CSV file does not include any Giant MBS grouping data. In some embodiments, Web Portal 1103 may analyze the collateral against a set of predefined rules for Giant MBS parameters, and form one or more Giant MBSes out of the unassigned collateral. Such rules and parameters may include, for example, verification rules discussed in further detail below. In some embodiments, Web Portal may employ one or more algorithms to minimize the number of Giant MBSes that are automatically created.

As further depicted in FIG. 11C, Web Portal 1103 may perform file and format validations (step 1133), as previously discussed and may also validate the collateral list contained in the CSV file, using public and/or private security information (step 1135). If the collateral list is validated, then the loan level system 1107 may retrieve pool and loan-level information including disclosure details for the collateral list (step 1137), format the retrieved data (step 1139), and transmit the information file to Web Portal 1103. If errors are detected during validation, Web Portal 1103 may generate one or more graphical user interfaces displaying errors on the client terminal 1101 (step 1141).

After receiving loan/pool information from the loan level system 1107, Web Portal 1103 may generate one or more graphical user interfaces having hyperlinked information to provide loan/pool level information for viewing or download at the client terminal (step 1143). For example, consistent with some advantages provided by the disclosed embodiments and Internet-connected systems, results from the deconstruction may be made available to the client terminal 1101 in near real time after receipt of the securities collateral information. In some embodiments, Web Portal 1103 may generate for display a graphical user interface having hyperlinked statuses. Clicking on a hyperlink in the "Status" field may cause Web Portal 1103 to generate a new graphical user interface to view results regarding successful deconstructions and error messages.

Client terminal 1101 may provide, either automatically or based on user input, whether to proceed with creating pseudo pools based on the received loan/pool information (step 1145). Client terminal 1101 may generate and upload a collateral assignment file to Web Portal (step 1147), where it may be received and validated (step 1149). In some embodiments, the pseudo pool validation file may include information such as, for example, a "Pseudo Pool Nickname" column, having unique identifiers to show Web Portal how to group the loans together for the formation of a new pool. The unique identifiers can be any alphanumeric entry, (e.g., "A", "B", "C", or "NY", "CA", etc.).

Web Portal 1103 may employ the loan level system 1107 to perform pseudo pool collateral file edits and validate the pools using pooling rules (step 1151). For example, pseudo pool assignment file may be checked for valid pools, matching values between the pools and the loans used, and for assignment of loans to the same pseudo pools per the product definition. Validation results may be provided to the user via Web Portal 1103 in real time or near real time (e.g., within a few minutes), as a result of the Internet connectivity enabling fast information transfer between geographically dispersed locations, and the ability to query real time information including updated rule sets from different locations simultaneously.

In some embodiments, validation may include the application of a plurality of rules and rule sets to verify that the pseudo pools conform to one or more predetermined rules. For example, Web Portal may verify that:

Term (such as a length of remaining payback time) must match for all loans in a pseudo pool;

Security coupon, the pass-through rate on the security, must match for all individual loans in a pseudo pool;

A pooling category must match for all individual loans in a pseudo pool; and

A time length of payment delay must match for all individual loans in a pseudo pool.

If the pseudo pools pass all edits and verification, then Web Portal 1103 may update a graphical user interface with hyperlinked status information indicating the validated pseudo pools (step 1153). Web Portal 1103 may also provide details to the loan level system for loan disclosures and bond information (step 1155). For example, Web Portal 1103 may generate one or more graphical user interfaces for display on the client terminal 1101 to provide validation results. The user may download the results via the client terminal 1101, which may include indications of errors in the pseudo pool (step 1157). In some embodiments, an exemplary error message may include a notification that the pseudo pool groups together collateral that cannot be combined due to a violation of one or more rules.

If the graphical user interface indicates the presence of errors, the error text may identify incompatible attributes. In some embodiments, Web Portal 1103 may determine and provide for display the values for each collateral item determined to be incompatible.

In some embodiments, the presence of errors in a pseudo pool may cause Web Portal 1103 to block access to a hyperlink for proceeding to create a REMIC structure file based on the pseudo pool. If Web Portal 1103 determines that no errors are present, the process may proceed to form the pseudo pool and provide one or more hyperlinks to download details for the purpose of creating a REMIC structure file.

Responsive to a determination that the client terminal submits instructions to proceed with REMIC creation (step 1159), the client terminal 1101 may submit a structure file identifying pseudo pools and any pools that cannot be further deconstructed because loan level data are not publicly available (i.e., non-deconstructible pools) (step 1161). Web Portal 1103 may process the received structure file to validate the REMIC structure (step 1163), and employ the loan level system 1107 to update one or more modeling tables identifying assumed collateral and expected collateral (step 1165). Loan level system 1107 may communicate with a modeling group 1133 to review the REMIC structure to ensure that all collateral, pseudo pools or non-deconstructible pools, are assigned to a group(s) (step 1167). Responsive to review by modeling group 1133, Web Portal 1103 may then generate for display a graphical user interface indicating that the pseudo pool(s) are formed, and provide one or more hyperlinks to files containing the assigned pool numbers for each pseudo pool formation request.

After successful formation of the pseudo pools, a validated pseudo pool formation file may be processed as a final validation to form the loan level pools to back a REMIC in a REMIC structure file. Web Portal 1103 may process the pseudo pool formation file or forward the file to another component of system 1000, or a third party system, to generate the REMIC structure file(s).

Figure 11D:
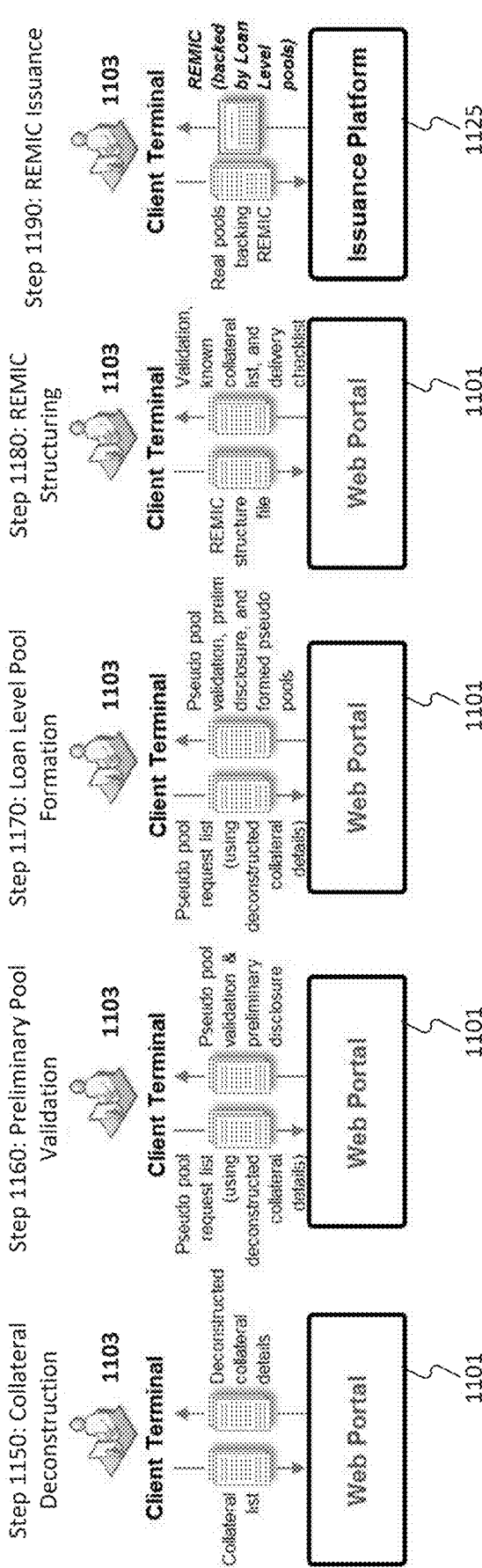

FIG. 11D shows a diagram of exemplary data flow steps for bidirectional data transfer between the client terminal 1101 and Web Portal 1103, consistent with disclosed embodiments. Details regarding the illustrated steps are discussed above with respect to at least FIG. 11B. For example, collateral deconstruction 1150 may correspond to step 1105a of FIG. 11B, preliminary pool validation 1160 may correspond to step 1105b of FIG. 11B, loan level pool formation 1170 may correspond to step 1105d of FIG. 11C, REMIC structuring 1180 may correspond to step 1105e of FIG. 11B, and REMIC issuance 1190 may be performed by issuance platform 1125 of FIG. 11B after step 1105e is complete.

Figure 12:
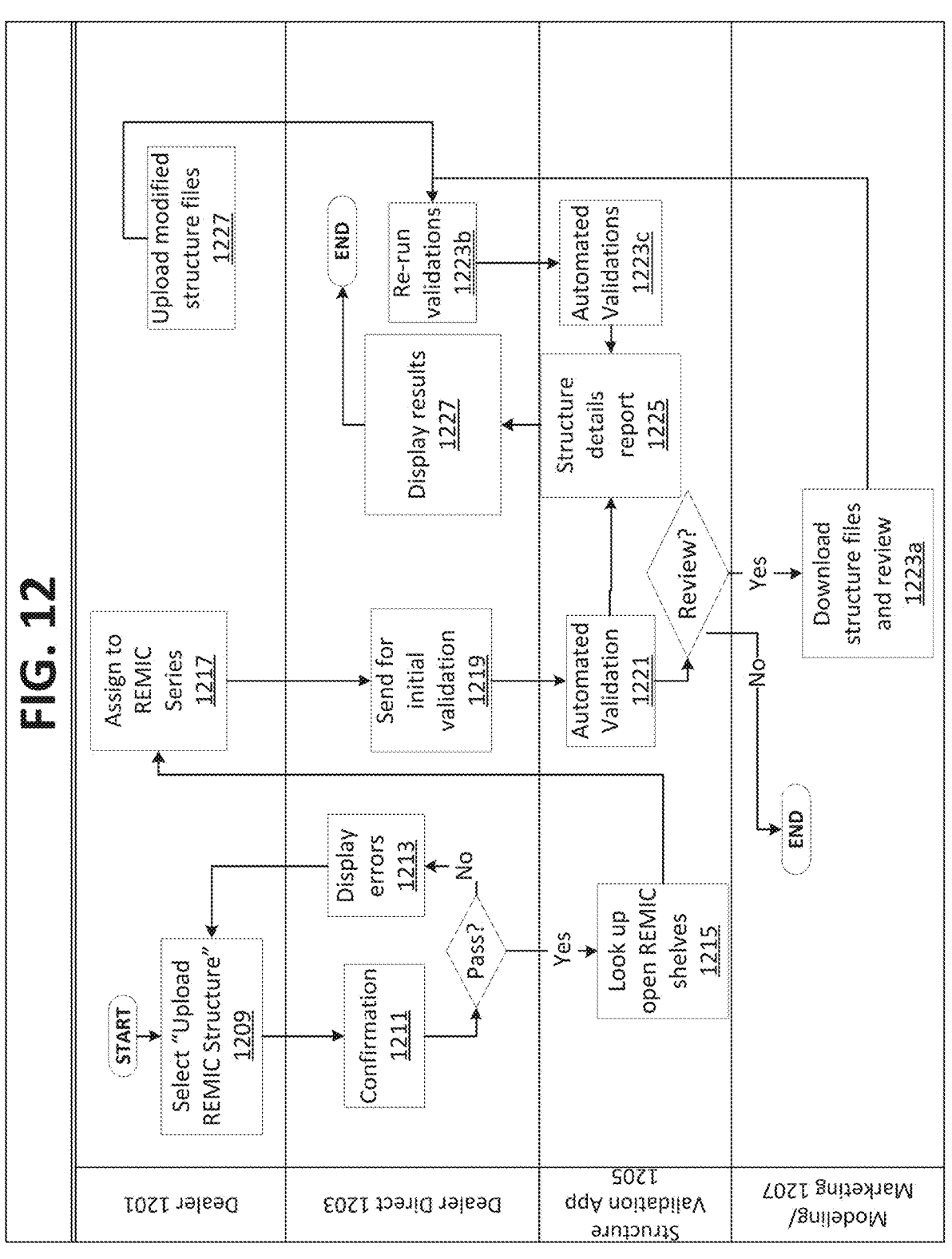
FIG. 12 depicts a flow chart of a process for validating REMIC structure files via Web Portal of the loan level system, consistent with disclosed embodiments.

FIG. 12 depicts a flow chart of a process for validating REMIC structure files via a Web Portal of the loan level system, consistent with disclosed embodiments. As depicted in FIG. 12, dealer 1201 (e.g., a REMIC dealer) may enter dealer direct 1203 (which may be accessed through a web portal, e.g., Web Portal 1103 of FIGS. 11A-11C). Dealer 1201 may select "Upload REMIC Structure" on the portal to begin process 1200 (step 1209).

Dealer 1201 may then upload a REMIC structure file to dealer direct 1203 (a Web Portal). Dealer Direct 1203 may perform file and format verifications (step 1211), as described above with respect to FIGS. 11A-11C. If the verification is passed, dealer direct 1203 may pass the verified REMIC structure file to structure validation application 1205 for processing. On the other hand, any errors may result in an error message being sent from dealer direct 1203 to dealer 1201 (step 1213).

As depicted in FIG. 12, structure validation application 1205 may check open REMIC shelves (step 1215) and allow dealer 1201 to assign the uploaded structure to a REMIC series pulled from the shelves (step 1217). Dealer direct 1203 may then validate the assigned REMIC series (step 1219). For example, structure validation application 1205 may automatically validate the uploaded REMIC structure against the assigned REMIC series (step 1221). Alternatively, structure validation application 1205 may forward the REMIC assignment to modeling/marketing system 1207 (e.g., modeling group 1133 of FIG. 11C). Modeling/marketing system 1207 may modify the REMIC structure files as necessary for consistency with the REMIC assignment (step 1223a). In such an alternative, dealer direct 1203 may re-submit the modified structure file to structure validation application 1205 (step 1223b) for a re-run of the previous validations (step 1223c).

In either embodiment, the results of the structure validation (or re-validation) may collated into a report by structure validation application 1205 (step 1225) and be display to dealer 1201 via dealer direct 1203 (step 1227). Dealer 1201 may then accept the structure to finalize the REMIC or may perform further edits (step 1227), which are then sent for re-validation.

Figure 13:
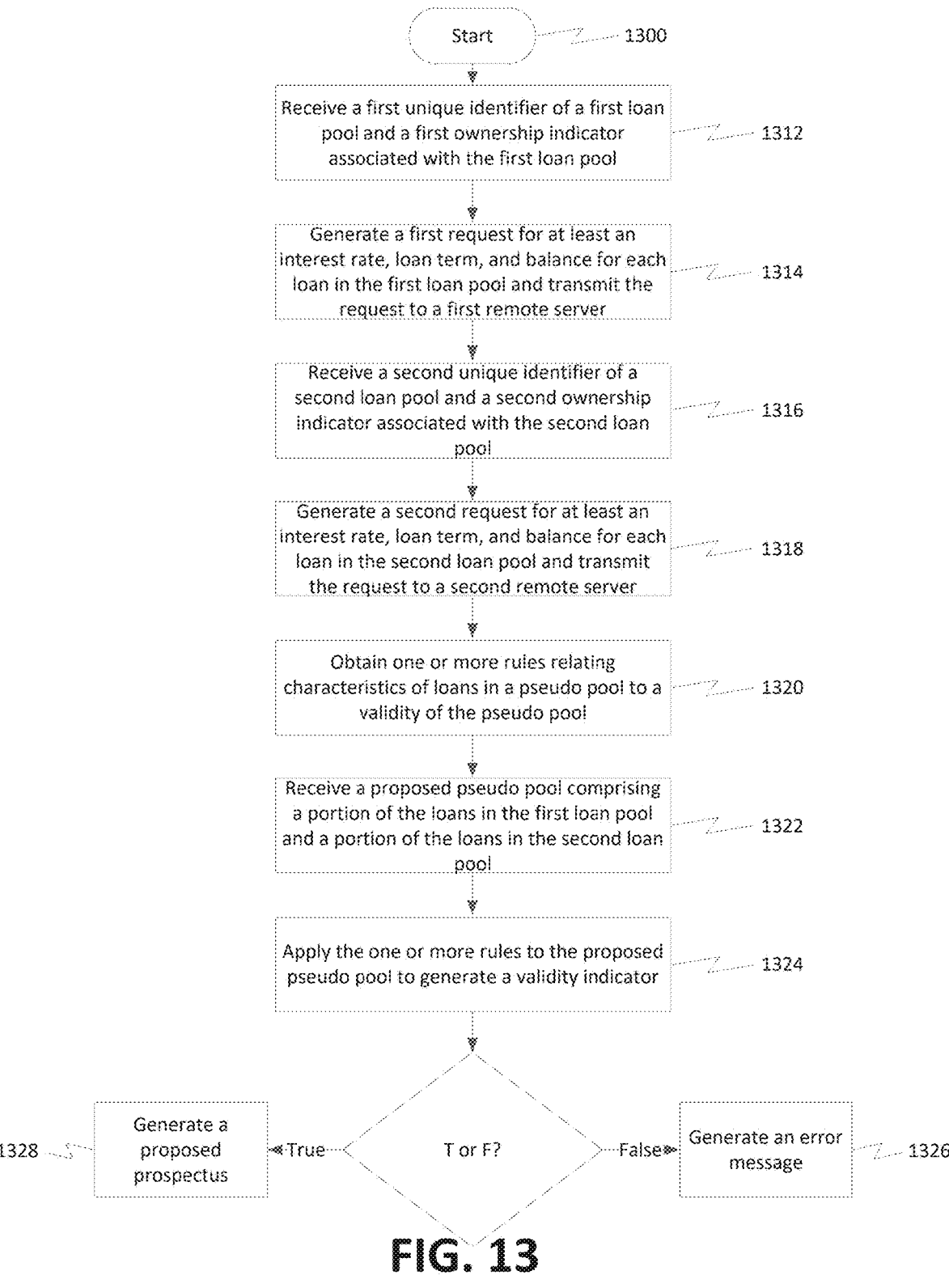
FIG. 13 depicts a flow chart of a process for conducting distributed search and retrieval of loan pools and applying rules for reorganization of the pools.

FIG. 13 depicts a flowchart of a process 1300 for distributed search and retrieval of loan pools and applying rules for reorganization of the pools for a property to be purchased.

Method 1300 may be implemented using one or more processors (e.g., CPU 1010 of FIG. 10).

At step 1312, the processor may receive a first unique identifier of a first loan pool and receive a first ownership indicator associated with the first loan pool. For example, as explained above, the processor may receive the unique identifier and the first ownership indicator using a web portal.

As used herein, an "ownership indicator" refers to an ownership percentage, a number of shares, or any other piece of data indicating a proportion of the first loan pool owned by a user reorganizing the pools.

At step 1314, the processor may generate a first request for at least an interest rate, loan term, and a balance for each loan in the first loan pool and transmit the first request to a first remote server identified as storing information regarding the first loan pool. For example, the first request may include the first unique identifier. Step 1314 may comprise a distributed search and retrieval, as explained above.

At step 1316, the processor may receive a second unique identifier of a second loan pool and receive a second ownership indicator associated with the second loan pool. For example, similar to step 1312, the processor may receive the unique identifier and the second ownership indicator using the web portal.

At step 1318, the processor may generate a second request for at least an interest rate, loan term and a balance for each loan in the second loan pool and transmit the second request to a second remote server identified as storing information regarding the second loan pool. For example, the second request may include second first unique identifier. Step 1318 may comprise a distributed search and retrieval, as explained above.

Although depicted separately, steps 1312 and 1316 may be combined. For example, a user of the web portal may submit the first unique identifier, first ownership indicator, second unique identifier, and second ownership indicator together. Additionally or alternatively, steps 1314 and 1318 may be combined. For example, the processor may generate and send requests concurrently.

Although described using two loan pools, any of the embodiments above may be performed with additional loan pools, e.g., with three, four, five, or the like loan pools. For each loan pool, a corresponding unique identifier and ownership indicator may be provided by the user, and the processor may generate a corresponding request for sending to a corresponding remote server. If any of the loan pools originated and/or are serviced by the same entity, the corresponding requests for such loan pools may be combined. For example, if the first loan pool and the second loan pool both have information stored on Freddie Mac servers, the processor may generate a single request including both the first unique identifier and the second unique identifier and send the request to the same remote server (or to different remote servers both on a Freddie Mac system).

At step 1320, the processor may obtain one or more rules relating characteristics of loans in a pseudo pool to a validity of the pseudo pool. For example, the rules may comprise requirements that particular characteristics of loans in a pseudo pool match for validity to be attained. Additionally or alternatively, the rules may comprise ranges that particular characteristics of loans in a pseudo pool may fall within for validity to be attained.

In one embodiment, the one or more rules may comprise a term rule requiring that terms of loans in the proposed pseudo pool match. For example, the term may comprise a length of remaining payback time. Additionally or alternatively, the one or more rules may comprise a security coupon rule requiring that pass-through rates of loans in the proposed pseudo pool match. Additionally or alternatively, the one or more rules comprise a payment delay rule requiring that time lengths of payment delays of loans in the proposed pseudo pool match.

Additionally or alternatively, the one or more rules may comprise a category rule requiring that pooling categories of loans in the proposed pseudo pool match. For example, the pooling categories may comprise at least one of a term category, a loan-to-value ratio category, and a credit score range category. The term category may comprise, for example, a 30-year term, a 15-year term, a 7-year term, or the like. The term category may further comprise, for example, fixed-rate terms, variable-rate terms, or any variants thereof, such as 7/1 adjustable rate terms, 5/1 adjustable rate terms, or the like. The loan-to-value (LTV) ratio category may be based on an origination LTV ratio and/or a current LTV ratio. The LTV ratio category may comprise a range, e.g., between 50% and 70%, less than 80%, between 60% and 90%, less than 95%, or the like. The credit score range category may be based on a credit score at originate and/or a credit score at present. The credit score range category may comprise a range for a credit score of one or more of the borrowers, e.g., the primary borrower, the borrower with the lowest credit score, the borrower with the highest credit score, or the like.

At step 1322, the processor may receive a proposed pseudo pool comprising a portion of the loans in the first loan pool and a portion of the loans in the second loan pool. For example, as explained above, the processor may receive a structure file defining the propose pseudo pool using a web portal.

At step 1324, the processor may apply the one or more rules to the proposed pseudo pool to generate a validity indicator. For example, the one or more rules may be applied as conditionals (e.g., using IF-THEN statements or other appropriate programming structures) to produce a Boolean comprising the validity indicator. In some embodiments, the processor may store the outcome of each conditional in addition to or in lieu of noting the final validity indicator.

Alternatively to steps 1322 and 1324, the processor may determine a proposed pseudo pool comprising a portion of the loans in the first loan pool and a portion of the loans in the second loan pool using the one or more rules. For example, the processor may match loans together in pools such that the one or more rules are satisfied.

In some embodiments, the proposed pseudo pool determination may be further based on characteristics of loans in the first loan pool and loans in the second loan pool. For example, the characteristics may comprise at least one of a term, a loan-to-value ratio, an interest rate, and a credit score of borrowers. In another example, the processor may match loans together that originate from the same region (e.g., same city, same metropolitan area, same county, same state, or the like) or may match loans together whose borrowers have similar (e.g., within a range) credit scores, incomes, liquid assets, or the like.

Additionally or alternatively, the proposed pseudo pool determination may be further based on an optimization algorithm for maximizing a predicted retail value of the proposed pseudo pool. For example, the processor may apply one or more functions that accept characteristics of the loans within the loan pool and output a predicted retail value. The processor may then use calculus, incremental optimization, or other techniques to maximize the predicted retail value.

At step 1326, when the validity indicator is false, the processor may generate an error message. For example, the error message may include an indicator of at least one rule in the obtained one or more rules that caused the validity indicator to be false. Accordingly, the processor may use stored outcomes of the conditionals from step 1324 to determine which conditional(s) (and, thus, which rule(s)) caused the validity indicator to be false. As explained above, the processor may display the error using the web portal and allow a user to try and re-submit a proposed pseudo pool.

At step 1328, when the validity indicator is true, the processor may generate a proposed disclosure document including the proposed pseudo pool. For example, the generated disclosure document may indicate that the proposed pseudo pool backs a group in a multi-class security. In one embodiment, the multi-class security is a Real Estate Mortgage Investment Conduit (REMIC). As explained above, the processor may output the disclosure document using the web portal. The user may thus review the disclosure document and even use it to pitch to potential investors before finalizing the pseudo pools.

Method 1300 may further include additional steps. For example, the processor may receive a second proposed pseudo pool comprising a portion of the loans in the first loan pool but not in the proposed pseudo pool and a portion of the loans in the second loan pool but not in the proposed pseudo pool and apply the one or more rules to the second proposed pseudo pool to generate a second validity indicator. When the second validity indicator is false, the processor may generate an error message, as explained above with respect to step 1326. When the second validity indicator is true, the processor may generate a second proposed disclosure document including the second proposed pseudo pool, as explained above with respect to step 1328. In some embodiments, the processor may generate a single disclosure document for both the first proposed pseudo pool and the second proposed pseudo pool.

Although the examples above and below are described using one or more proposed pseudo pools, any of the embodiments above may be performed with additional pseudo pools, e.g., with three, four, five, or the like pseudo pools. Moreover, although described separately, receiving two or more pseudo pools may be performed in one step. For example, a user of the web portal may submit the structure files defining the pseudo pools together or may submit a single structure file defining multiple pseudo pools. Additionally or alternatively, application of the one or more rules to two or more proposed pseudo pools may be performed in one step.

In embodiments where the processor determines the proposed pseudo pool, method 1300 may further include determining a second proposed pseudo pool comprising a portion of the loans in the first loan pool but not in the proposed pseudo pool and a portion of the loans in the second loan pool but not in the proposed pseudo pool using the one or more rules. In such embodiments, the proposed disclosure document may include the proposed pseudo pool and the second proposed pseudo pool. Alternatively, the processor may generate a separate proposed disclosure document for the second proposed pseudo pool, as discussed above.

Moreover, in such embodiments, the proposed pseudo pool determination may be further based on an optimization algorithm for maximizing a predicted combined retail value of the proposed pseudo pool and the second proposed pseudo pool. For example, the processor may apply one or more functions that accept characteristics of the loans within the loan pool and output a predicted retail value. The processor may apply the one or more functions to both the proposed pseudo pool and the second proposed pseudo pool and then use calculus, incremental optimization, or other techniques to maximize the sum of the predicted retail values.

In any of the embodiments above, method 1300 may further include finalizing the proposed pseudo pool(s). For example, when the validity indicator is true, the processor may generate a proposed disclosure document including the proposed pseudo pool, receive approval of the proposed pseudo pool, and form a pseudo pool comprising the proposed pseudo pool. In one example, forming the pseudo pool may comprise identifying a plurality of cash flows, each cash flow being associated with a loan in the first pool or in the second pool; directing one or more of the plurality of cash flows to the pseudo pool, the one or more cash flows being associated with the loans comprising the pseudo pool; and forming a security backed by the loans comprising the pseudo pool, wherein a holder of the security is entitled to at least a portion of the one or more cash flows. For example, the security may comprise a REMIC, as described above.

In such embodiments, the processor may further receive a second proposed pseudo pool comprising a portion of the loans in the first loan pool but not in the proposed pseudo pool and a portion of the loans in the second loan pool but not in the proposed pseudo pool and apply the one or more rules to the second proposed pseudo pool to generate a second validity indicator. When the second validity indicator is false, the processor may generate an error message, as explained above with respect to step 1326. When the second validity indicator is true, the processor may generate a second proposed disclosure document including the second proposed pseudo pool, receive approval of the second proposed pseudo pool, and form a second pseudo pool comprising the second proposed pseudo pool. In one example, forming the second pseudo pool may comprise identifying a plurality of cash flows, each cash flow being associated with a loan in the first pool or in the second pool; directing one or more of the plurality of cash flows to the second pseudo pool, the one or more cash flows being associated with the loans comprising the second pseudo pool; and forming a security backed by the loans comprising the pseudo pool, wherein a holder of the security is entitled to at least a portion of the one or more cash flows. For example, the security may comprise a REMIC, as described above.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented with hardware alone. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive.

Instructions or operational steps stored by a computer-readable medium may be in the form of computer programs, program modules, or codes. As described herein, computer programs, program modules, and code based on the written description of this specification, such as those used by the processor, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system for conducting distributed search and retrieval of loan-level data for a plurality of loan pools and for generating rules-based validity indicators and disclosure documents associated with reorganization of loans within the loan pools, the system comprising:

at least one memory storing instructions; and
at least one networked server computing system having at least one processor in communication with a plurality of client terminals, the at least one processor configured to execute the instructions to perform operations comprising:
generating and providing a web portal for interactively communicating with the plurality of client terminals;
receiving, from one of the client terminals via the web portal, a first comma separated value (CSV) file having collateral list information for a plurality of columns in a table, the collateral list information including a first unique identifier of a first loan pool, a loan pool number, and an original par amount, the first loan pool being associated with a first electronic mortgage backed security;
deconstructing the first electronic mortgage backed security by:
verifying that the first unique identifier and the loan pool number conform to one or more alphanumeric format requirements;
receiving, via the web portal, a first ownership indicator associated with the first loan pool;
generating a first distributed search and retrieval request for a first multi-tiered determination of at least an interest rate, loan term, and a balance for each loan in the first loan pool, the first request including the first unique identifier;

transmitting the first request through a network of distributed databases to a first remote server identified by a database management program as storing information regarding the first loan pool; and receiving, from the first remote server information regarding the first loan pool such as an interest rate, loan term, or balance for each loan in the first loan pool, wherein a first electronic certificate is preserved for the first electronic mortgage backed security;

receiving, from the one of the client terminals via the web portal, a second comma separated value (CSV) file having collateral list information for a plurality of columns in a table, the collateral list information including a second unique identifier of a second loan pool, the second loan pool being associated with a second electronic mortgage backed security or the first electronic mortgage backed security;

deconstructing the second electronic mortgage backed security by:

receiving, via the web portal, a second ownership indicator associated with the second loan pool;

communicating with a securities database to identify, based on the second unique identifier, a second remote server or at least one of the distributed databases storing information associated with the second loan pool;

generating a second distributed search and retrieval request for a second multi-tiered determination of at least an interest rate, a loan term, and a balance for each loan in the second loan pool, the second request including the second unique identifier;

transmitting the second request to the identified distributed databases or the second remote server identified by the database management program as storing information associated with the second loan pool; and receiving, from the second remote server information regarding the second loan pool such as an interest rate, loan term, or balance for each loan in the second loan pool, wherein a second electronic certificate is preserved for the second electronic mortgage backed security;

obtaining one or more stored pseudo pool rules, the pseudo pool rules identifying required characteristics of loans in a pseudo pool related to a validity indication of the pseudo pool, the loans in the pseudo pool comprising a combination of the first loan pool and the second loan pool loans, wherein the required characteristics relate to information received by the first remote server and the second remote server in response to the first and second distributed search and retrieval requests;

determining whether the first request and the second request originate from a shared server;

based on the determination that the first request and second request originate from a shared server, generating a combined request and sending the combined request to the first remote server or the second remote server;

receiving a completed data template from a client terminal, the completed data template including one or more data entries;

analyzing the completed data template by prescreening for errors and verifying the relationships between the one or more data entries and the pseudo pool rules;

generating, based on the completed data template, a data file, wherein the data file is an input to a client terminal, the data file including information to automatically partition and redirect electronic payments associated with the loans of the proposed pseudo pool to one or more electronic accounts associated with loans identified in the data file;

receiving a structured data file identifying a proposed pseudo pool from the web portal, the structured data file identifying a portion of the loans in the first loan pool and a portion of the loans in the second loan pool;

applying the one or more pseudo pool rules to the structured data file to generate a validity indicator within minutes of receipt of the second ownership indicator, the generated validity indicator being based on application of the one or more pseudo pool rules to the information received in response to the first and second distributed search and retrieval requests, the validity indicator comprising a Boolean;

storing the Boolean in the memory;

responsive to a determination that the validity indicator is false due to a violation of the one or more pseudo pool rules by the proposed pseudo pool, identifying the violated one or more pseudo pool rules based on the stored Boolean, generating an error message and providing the error message for display in the web portal;

responsive to a determination that the validity indicator is true, generating a proposed disclosure document including the information received in response to the first and second distributed search and retrieval requests for each loan in the proposed pseudo pool, wherein the first and second electronic certificates remain unmodified by the generation of the proposed disclosure document, and wherein the proposed disclosure document includes information that configures one or more payment processing systems associated with at least one of the first loan pool or the second loan pool to automatically partition and redirect electronic payments associated with the loans of the proposed pseudo pool to one or more electronic accounts associated with loans identified in the proposed disclosure document;

determining, in the one or more pseudo pools, the presence of an error;

providing, to the web portal, a graphical user interface having hyperlinked information to provide at least one of:

results or errors of the deconstruction of the first mortgage backed security; or results or errors of the deconstruction of the second mortgage backed security;

responsive to the determination of an error in the one or more pseudo pools, blocking access to the hyperlinked information; and transmitting the proposed disclosure document to the client terminal via the web portal.

2. The system of claim 1, wherein the one or more pseudo pool rules comprise a term rule requiring that terms of loans in the proposed pseudo pool match.

3. The system of claim 2, wherein the term comprises a length of remaining payback time.

4. The system of claim 1, wherein the one or more pseudo pool rules comprise a security coupon rule requiring that pass-through rates of loans in the proposed pseudo pool match.

5. The system of claim 1, wherein the one or more pseudo pool rules comprise a category rule requiring that pooling categories of loans in the proposed pseudo pool match.

6. The system of claim 5, wherein the pooling categories comprise at least one of an initial interest rate category and a relocation category.

7. The system of claim 1, wherein the one or more pseudo pool rules comprise a payment delay rule requiring that time lengths of payment delays of loans in the proposed pseudo pool match.

8. The system of claim 1, wherein the generated disclosure document indicates that the proposed pseudo pool backs a group in a multi-class security.

9. The system of claim 8, wherein the multi-class security is a Real Estate Mortgage Investment Conduit (REMIC).

10. The system of claim 1, wherein the operations further comprise:

receiving, via the at least one processor, a second proposed pseudo pool from the web portal comprising a portion of the loans in the first loan pool but not in the proposed pseudo pool and a portion of the loans in the second loan pool but not in the proposed pseudo pool;

applying, via the at least one processor, the one or more pseudo pool rules to the second proposed pseudo pool to generate a second validity indicator;

responsive to a determination that the second validity indicator is false, generating, via the at least one processor, an error message for display in the web portal; and responsive to a determination that the second validity indicator is true, generating, via the at least one processor, a second proposed disclosure document including the second proposed pseudo pool.

11. The system of claim 1, wherein the error message includes an indicator of at least one rule in the obtained one or more pseudo pool that caused the validity indicator to be false.

12. A system for conducting distributed search and retrieval of loan-level data for a plurality of loan pools and for generating rules-based validity indicators and disclosure documents associated with reorganization of loans within the loan pools, the system comprising:

at least one memory storing instructions; and at least one networked server computing system having at least one processor in communication with a plurality of client terminals, the at least one processor configured to execute the instructions to perform operations comprising:

generating and providing a web portal for interactively communicating with the plurality of client terminals;

receiving, from one of the client terminals via the web portal, a first comma separated value (CSV) file having collateral list information for a plurality of columns in a table, the collateral list information including a first unique identifier of a first loan pool, a loan pool number, and an original par amount, the first loan pool being associated with a first electronic mortgage backed security;

deconstructing the first electronic mortgage backed security by:

verifying that the first unique identifier and the loan pool number conform to one or more alphanumeric format requirements;

receiving, via the web portal, a first ownership indicator associated with the first loan pool;

generating a first distributed search and retrieval request for a first multi-tiered determination of at least an interest rate, loan term, and a balance for each loan in the first loan pool, the first request including the first unique identifier;

transmitting the first distributed search and retrieval request through a network of distributed databases to a first remote server identified by a database management program as storing information regarding the first loan pool;

receiving, from the first remote server information regarding the first loan pool such as an interest rate, loan term, or balance for each loan in the first loan pool, wherein a first electronic certificate is preserved for the first electronic mortgage backed security; and applying one or more rules relating ownership indicators to loans in a loan pool to the first ownership indicator and the loans of the first loan pool to automatically select a relevant first subset of loans;

receiving, from the one of the client terminals via the web portal, a second comma separated value (CSV) file having collateral list information for a plurality of columns in a table, the collateral list information including a second unique identifier of a second loan pool, the second loan pool being associated with a second electronic mortgage backed security or the first electronic mortgage backed security;

deconstructing the second electronic mortgage backed security by:

receiving, via the web portal, a second ownership indicator associated with the second loan pool;

communicating with a securities database to identify, based on the second unique identifier, a second remote server or at least one of the distributed databases storing information associated with the second loan pool;

generating a second distributed search and retrieval request for a second multi-tiered determination of at least an interest rate, loan term, and a balance for each loan in the second loan pool, the second request including the second unique identifier;

transmitting the second request to the identified distributed databases or the second remote server identified by the database management program as storing information associated with the second loan pool;

receiving, from the second remote server information regarding the second loan pool such as an interest rate, loan term, or balance for each loan in the second loan pool, wherein a second electronic certificate is preserved for the second electronic mortgage backed security; and applying, via the at least one processor, the one or more rules relating ownership indicators to loans in a loan pool to the second ownership indicator and the loans of the second loan pool to automatically select a relevant second subset of loans;

obtaining one or more stored pseudo pool rules identifying required characteristics of loans in a pseudo pool related to a validity indication of the pseudo pool, the loans in the pseudo pool comprising a combination of the first loan pool and the second loan pool loans, wherein the required characteristics relate to information received by the first remote server and the second remote server in response to the first and second distributed search and retrieval requests;

determining whether the first request and the second request originate from a shared server;

based on the determination that the first request and second request originate from a shared server, generating a combined request and sending the combined request to the first remote server or the second remote server;

receiving a completed data template from a client terminal, the completed data template including one or more data entries;

analyzing the completed data template by prescreening for errors and verifying the relationships between the one or more data entries and the pseudo pool rules;

generating, based on the completed data template, a data file, wherein the data file is an input to a client terminal, the data file including information to automatically partition and redirect electronic payments associated with the loans of the proposed pseudo pool to one or more electronic accounts associated with loans identified in the data file;

determining a proposed pseudo pool comprising a portion of the relevant first subset of loans and a portion of the relevant second subset of loans based on the automatically-selected first and second subsets of loans and using the one or more pseudo pool rules within minutes of the proposed pseudo pool being determined based on an application of the pseudo pool rules to information received in response to the first and second distributed search and retrieval requests;

generating a structured data file identifying the determined proposed pseudo pool;

generating a proposed disclosure document including the information received in response to the first and second distributed search and retrieval requests for each loan in the proposed pseudo pool, wherein the first and second electronic certificates remain unmodified by the generation of the proposed disclosure document, and wherein the proposed disclosure document includes information that configures one or more for configuring a payment processing systems associated with at least one of the first loan pool or the second loan pool to automatically route partition and redirect electronic payments associated with the loans of the proposed pseudo pool to one or more electronic accounts associated with loans identified in the proposed disclosure document;

determining, in the one or more pseudo pools, the presence of an error;

providing, to the web portal, a graphical user interface having hyperlinked information to provide at least one of:

results or errors of the deconstruction of the first mortgage backed security; or results or errors of the deconstruction of the second mortgage backed security; and responsive to the determination of an error in the one or more pseudo pools, blocking access to the hyperlinked information.

13. The system of claim 12, wherein the proposed pseudo pool determination is further based on characteristics of loans in the first loan pool and loans in the second loan pool in the information received by the at least one processor in response to the first and second distributed search and retrieval requests.

14. The system of claim 13, wherein the characteristics comprise at least one of a term, a loan-to-value ratio, an interest rate, and a credit score of borrowers.

15. The system of claim 12, wherein the proposed pseudo pool determination is further based on an optimization algorithm for maximizing a predicted retail value of the proposed pseudo pool.

16. The system of claim 12, wherein the operations further comprise:

determining, via the at least one processor, a second proposed pseudo pool from the web portal comprising a portion of the loans in the relevant first subset of loans but not in the proposed pseudo pool and a portion of the loans in the relevant second subset of loans but not in the proposed pseudo pool using the one or more rules, wherein the proposed disclosure document includes the proposed pseudo pool and the second proposed pseudo pool.

17. The system of claim 16, wherein the proposed pseudo pool determination is further based on an optimization algorithm for maximizing a predicted combined retail value of the proposed pseudo pool and the second proposed pseudo pool.

18. A method for conducting distributed search and retrieval of loan-level data for a plurality of loan pools and for generating rules-based validity indicators and disclosure documents associated with reorganization of loans within the loan pools, the method performed by at least one processor of a networked server computing system in communication with a plurality of client terminals, the at least one processor being configured to perform steps comprising:

generating and providing a web portal for interactively communicating with the plurality of client terminals;

receiving, by the at least one processor, from one of the a client terminals via the web portal, a first comma separated value (CSV) file having collateral list information for a plurality of columns in a table, the collateral list information including a first unique identifier of a first loan pool, a loan pool number, an original par amount, and a first ownership indicator associated with the first loan pool, the first loan pool being associated with a first electronic mortgage backed security;

deconstructing the first electronic mortgage backed security by:

verifying that the first unique identifier and the loan pool number conform to one or more alphanumeric format requirements;

determining, by the at least one processor querying a securities database based on the first unique identifier, at least one first remote server storing information regarding the first loan pool;

generating, by the at least one processor and using the first unique identifier, a first distributed search and retrieval request for a first multi-tiered determination of at least an interest rate, a loan term, and a balance for each loan in the first loan pool;

transmitting, by the at least one processor, the first distributed search and retrieval request through a network of distributed databases to the at least one first remote server; and receiving, from the first remote server information regarding the first loan pool such as an interest rate, loan term, or balance for each loan in the first loan pool, wherein a first electronic certificate is preserved for the first electronic mortgage backed security;

receiving, from one of the client terminals via the web portal, a second comma separated value (CSV) file having collateral list information for a plurality of columns in a table, the collateral list information including a second unique identifier of a second loan pool, a loan pool number, an original par amount, and a second ownership indicator associated with the second loan pool, the second loan pool being associated with a second electronic mortgage backed security or the first electronic mortgage backed security;

deconstructing the second electronic mortgage backed security by:

verifying that the second unique identifier and the loan pool number conform to one or more alphanumeric format requirements;

determining, by the at least one processor querying the securities database based on the second unique identifier, at least one second remote server storing information regarding the second loan pool;

generating, by the at least one processor using the second unique identifier, a second distributed search and retrieval request for a second multi-tiered determination of at least an interest rate, a loan term, and a balance for each loan in the second loan pool;

transmitting, by the at least one processor, the second request through the network of distributed databases to the determined at least one second remote server;

receiving, from the second remote server information regarding the second loan pool such as an interest rate, loan term, or balance for each loan in the second loan pool, wherein a second electronic certificate is preserved for the second electronic mortgage backed security;

obtaining, by the at least one processor, one or more stored pseudo pool rules identifying required characteristics of loans in a pseudo pool related to a validity indication of the pseudo pool, the loans in the pseudo pool comprising a combination of the first loan pool and the second loan pool loans, wherein the required characteristics relate to information received by the first remote server and the second remote server in response to the first and second distributed search and retrieval requests;

determining whether the first request and the second request originate from a shared server;

based on the determination that the first request and second request originate from a shared server, generating a combined request and sending the combined request to the first remote server or the second remote server;

receiving a completed data template from a client terminal, the completed data template including one or more data entries;

analyzing the completed data template by prescreening for errors and verifying the relationships between the one or more data entries and the pseudo pool rules;

generating, based on the completed data template, a data file, wherein the data file is an input to a client terminal, the data file including information to automatically partition and redirect electronic payments associated with the loans of the proposed pseudo pool to one or more electronic accounts associated with loans identified in the data file;

receiving, by the at least one processor, structured data file identifying a proposed pseudo pool from the web portal, the structured data file identifying a portion of the loans in the first loan pool and a portion of the loans in the second loan pool;

applying, by the at least one processor, the one or more pseudo pool rules to the structured data file to generate a validity indicator within minutes of receipt of the second ownership indicator, the generated validity indicator being based on application of the one or more pseudo pool rules to the information received in response to the first and second distributed search and retrieval requests, the validity indicator comprising a Boolean;

storing, by the at least one processor, the Boolean in a memory of the computing system;

generating, by the at least one processor and responsive to a determination that the validity indicator is false, an error message and providing the error message for display in the web portal, wherein the error message indicates a violation of the one or more pseudo pool rules by the proposed pseudo pool;

responsive to the determination that the validity indicator is false, identifying the violated one or more pseudo pool rules based on the stored Boolean;

responsive to a determination by the at least one processor that the validity indicator is true, generating a proposed disclosure document including the information received in response to the first and second distributed search and retrieval requests for each loan in the proposed pseudo pool, wherein the first and second electronic certificates remain unmodified by the generation of the proposed disclosure document, and wherein the proposed disclosure document includes information that configures one or more payment processing systems associated with at least one of the first loan pool or the second loan pool to automatically route partition and redirect electronic payments associated with the loans of the proposed pseudo pool to one or more electronic accounts associated with loans identified in the proposed disclosure document;

determining, in the one or more pseudo pools, the presence of an error;

providing, to the web portal, a graphical user interface having hyperlinked information to provide at least one of:

results or errors of the deconstruction of the first mortgage backed security; or results or errors of the deconstruction of the second mortgage backed security;

responsive to the determination of an error in the one or more pseudo pools, blocking access to the hyperlinked information;

receiving, via the web portal, an indication of approval of the proposed pseudo pool identified in the proposed disclosure document; and forming, by the at least one processor in response to the received approval indication, an electronic record of a pseudo pool corresponding to the proposed pseudo pool.

19. The method of claim 18, wherein forming the pseudo pool comprises:

identifying, by the at least one processor, a plurality of cash flows, each cash flow being associated with a loan in the first pool or in the second pool;

directing, by the at least one processor, one or more of the plurality of cash flows to the pseudo pool, the one or more cash flows being associated with the loans comprising the pseudo pool; and forming, by the at least one processor, a security backed by the loans comprising the pseudo pool, wherein a holder of the security is entitled to at least a portion of the one or more cash flows.

20. The method of claim 18, wherein the operations further comprise:

receiving, by the at least one processor, a second proposed pseudo pool comprising a portion of the loans in the first loan pool but not in the proposed pseudo pool and a portion of the loans in the second loan pool but not in the proposed pseudo pool;

applying, by the at least one processor, the one or more rules to the second proposed pseudo pool to generate a second validity indicator;

when the second validity indicator is false: generating, by the at least one processor, an error message; and when the second validity indicator is true:

generating, by the at least one processor, a second proposed disclosure document including the second proposed pseudo pool, receiving, by the at least one processor, approval of the second proposed pseudo pool, and forming, by the at least one processor, a second pseudo pool comprising the second proposed pseudo pool.

21. The method of claim 20, wherein forming the second pseudo pool comprises:

identifying, by the at least one processor, a plurality of cash flows, each cash flow being associated with a loan in the first pool or in the second pool;

directing, by the at least one processor, one or more of the plurality of cash flows to the second pseudo pool, the one or more cash flows being associated with the loans comprising the second pseudo pool; and forming, by the at least one processor, a security backed by the loans comprising the pseudo pool, wherein a holder of the security is entitled to at least a portion of the one or more cash flows.

* * * * *